US012388869B2

(12) United States Patent
Nguyen

(10) Patent No.: US 12,388,869 B2
(45) Date of Patent: Aug. 12, 2025

(54) MESSAGE MANAGEMENT PLATFORM FOR PERFORMING IMPERSONATION ANALYSIS AND DETECTION

(71) Applicant: Proofpoint, Inc., Sunnyvale, CA (US)

(72) Inventor: Harold Nguyen, San Carlos, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 18/732,870

(22) Filed: Jun. 4, 2024

(65) Prior Publication Data

US 2024/0422194 A1 Dec. 19, 2024

Related U.S. Application Data

(63) Continuation of application No. 18/077,479, filed on Dec. 8, 2022, now Pat. No. 12,041,086, which is a continuation of application No. 16/697,918, filed on Nov. 27, 2019, now Pat. No. 11,552,990.

(60) Provisional application No. 62/815,088, filed on Mar. 7, 2019.

(51) Int. Cl.
*H04L 9/40* (2022.01)
*G06N 5/04* (2023.01)
*G06N 20/00* (2019.01)
*H04L 51/212* (2022.01)
*H04L 51/224* (2022.01)

(52) U.S. Cl.
CPC .......... *H04L 63/1483* (2013.01); *G06N 5/04* (2013.01); *G06N 20/00* (2019.01); *H04L 51/212* (2022.05); *H04L 51/224* (2022.05)

(58) Field of Classification Search
CPC . H04L 63/1483; H04L 51/224; H04L 51/212; G06N 20/00; G06N 5/04
See application file for complete search history.

(56) References Cited

U.S. PATENT DOCUMENTS

| | | | |
|---|---|---|---|
| 7,363,495 | B2 | 4/2008 | Felt et al. |
| 7,970,705 | B2 | 6/2011 | Patterson |
| 8,489,635 | B1 | 7/2013 | Phoha et al. |
| 9,177,293 | B1 | 11/2015 | Gagnon et al. |
| 9,268,927 | B1 | 2/2016 | Phoha et al. |
| 9,418,057 | B2 | 8/2016 | de Zeeuw et al. |

(Continued)

OTHER PUBLICATIONS

Apr. 20, 2020 (EP) Extended European Search Report—App. 19214226.3.

(Continued)

*Primary Examiner* — Tadesse Hailu
(74) *Attorney, Agent, or Firm* — Banner & Witcoff, Ltd.

(57) ABSTRACT

Aspects of the disclosure relate to detecting impersonation in email body content using machine learning. Based on email data received from user accounts, a computing platform may generate user identification models that are each specific to one of the user accounts. The computing platform may intercept a message from a first user account to a second user account and may apply a user identification model, specific to the first user account, to the message, so as to calculate feature vectors for the message. The computing platform then may apply impersonation algorithms to the feature vectors and may determine that the message is impersonated. Based on results of the impersonation algorithms, the computing platform may modify delivery of the message.

19 Claims, 14 Drawing Sheets

(56) References Cited

U.S. PATENT DOCUMENTS

| | | |
|---|---|---|
| 9,667,639 B1 | 5/2017 | Pierson et al. |
| 10,320,811 B1 | 6/2019 | Faham et al. |
| 10,805,311 B2 | 10/2020 | Greevy |
| 10,965,696 B1* | 3/2021 | Amram .................. G06N 20/00 |
| 11,330,003 B1 | 5/2022 | Howell et al. |
| 2002/0078365 A1* | 6/2002 | Burnett .................. G06F 21/31 |
| | | 726/26 |
| 2002/0138583 A1* | 9/2002 | Takayama ........... H04L 61/4555 |
| | | 715/752 |
| 2004/0221062 A1 | 11/2004 | Starbuck et al. |
| 2004/0225647 A1 | 11/2004 | Connelly et al. |
| 2006/0168024 A1 | 7/2006 | Mehr et al. |
| 2007/0050376 A1 | 3/2007 | Maida-Smith et al. |
| 2008/0072294 A1* | 3/2008 | Chatterjee ............. H04L 9/3271 |
| | | 726/4 |
| 2013/0138427 A1 | 5/2013 | de Zeeuw et al. |
| 2016/0014151 A1 | 1/2016 | Prakash |
| 2017/0034183 A1 | 2/2017 | Enqvist et al. |
| 2017/0078884 A1 | 3/2017 | Tanabe et al. |
| 2017/0251006 A1* | 8/2017 | LaRosa ............... H04L 63/1441 |
| 2017/0257395 A1* | 9/2017 | Goutal .................. H04L 63/123 |
| 2018/0152471 A1 | 5/2018 | Jakobsson |
| 2018/0375877 A1 | 12/2018 | Jakobsson et al. |
| 2019/0132273 A1 | 5/2019 | Ryan et al. |
| 2019/0268373 A1* | 8/2019 | Celik .................... G06V 30/418 |
| 2019/0306192 A1* | 10/2019 | Xie ........................ H04L 69/22 |
| 2020/0134009 A1 | 4/2020 | Zhao et al. |
| 2020/0204572 A1 | 6/2020 | Jeyakumar et al. |
| 2021/0058395 A1* | 2/2021 | Jakobsson ............. H04L 67/306 |
| 2021/0126942 A1* | 4/2021 | Fantham ............... H04L 51/212 |
| 2021/0176275 A1* | 6/2021 | Celik .................... G06F 21/554 |

OTHER PUBLICATIONS

Aug. 2, 2012 (EP) First Examination Report—App. 19214226.3.
May 27, 2022—Non-Final Office Action—U.S. Appl. No. 16/697,918.
Sep. 14, 2022—(US) Notice of Allowance—U.S. Appl. No. 16/697,918.

* cited by examiner

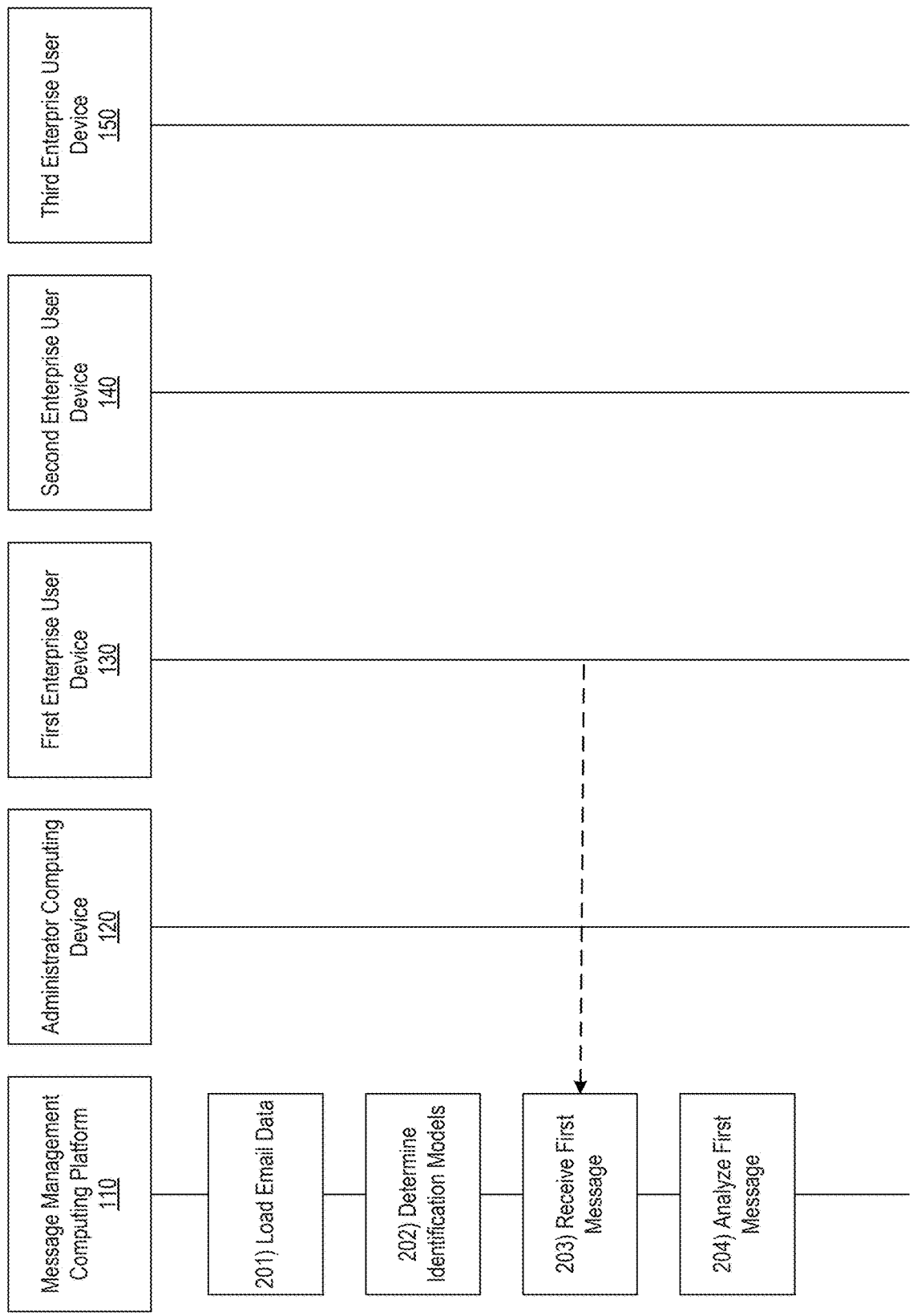

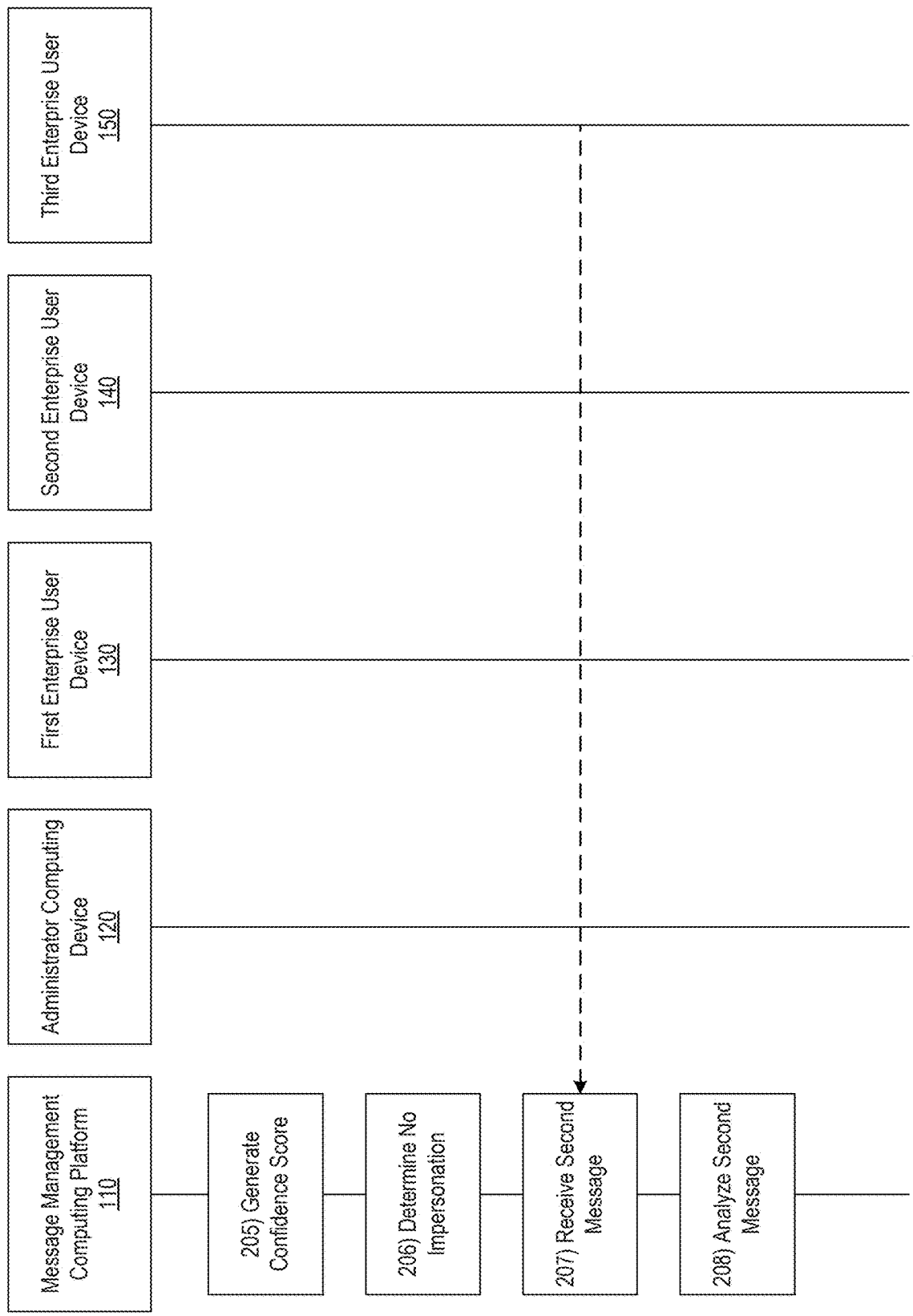

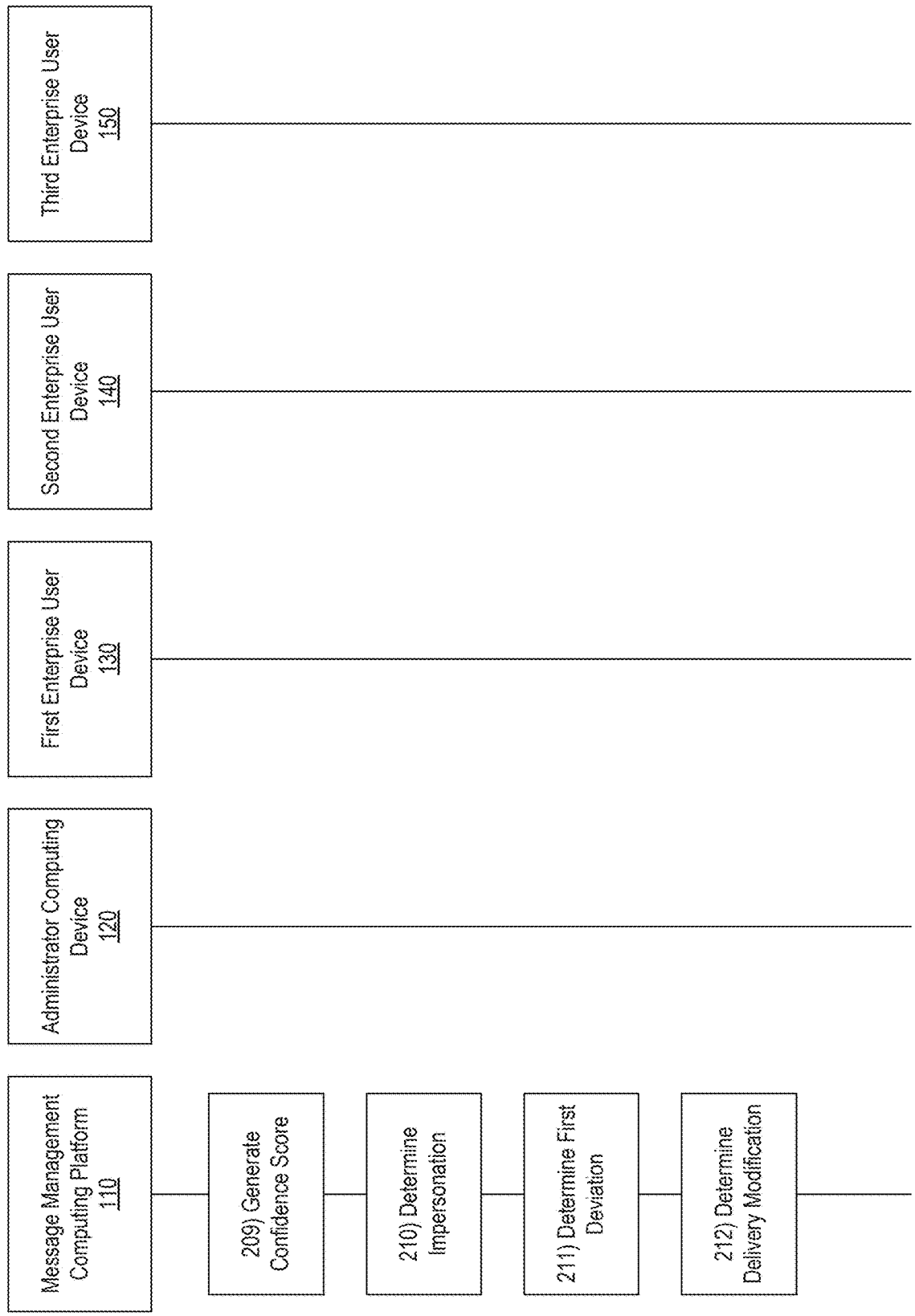

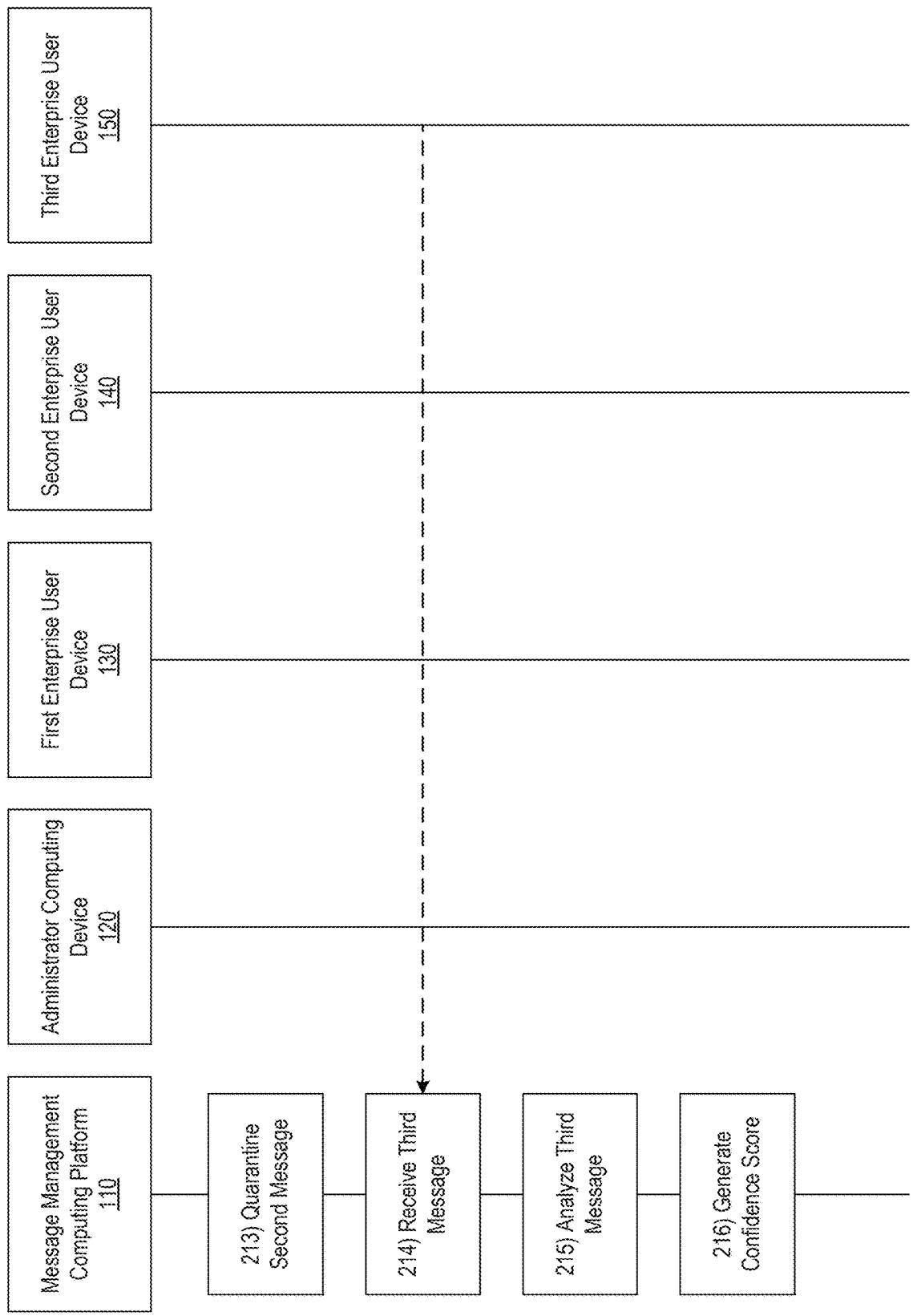

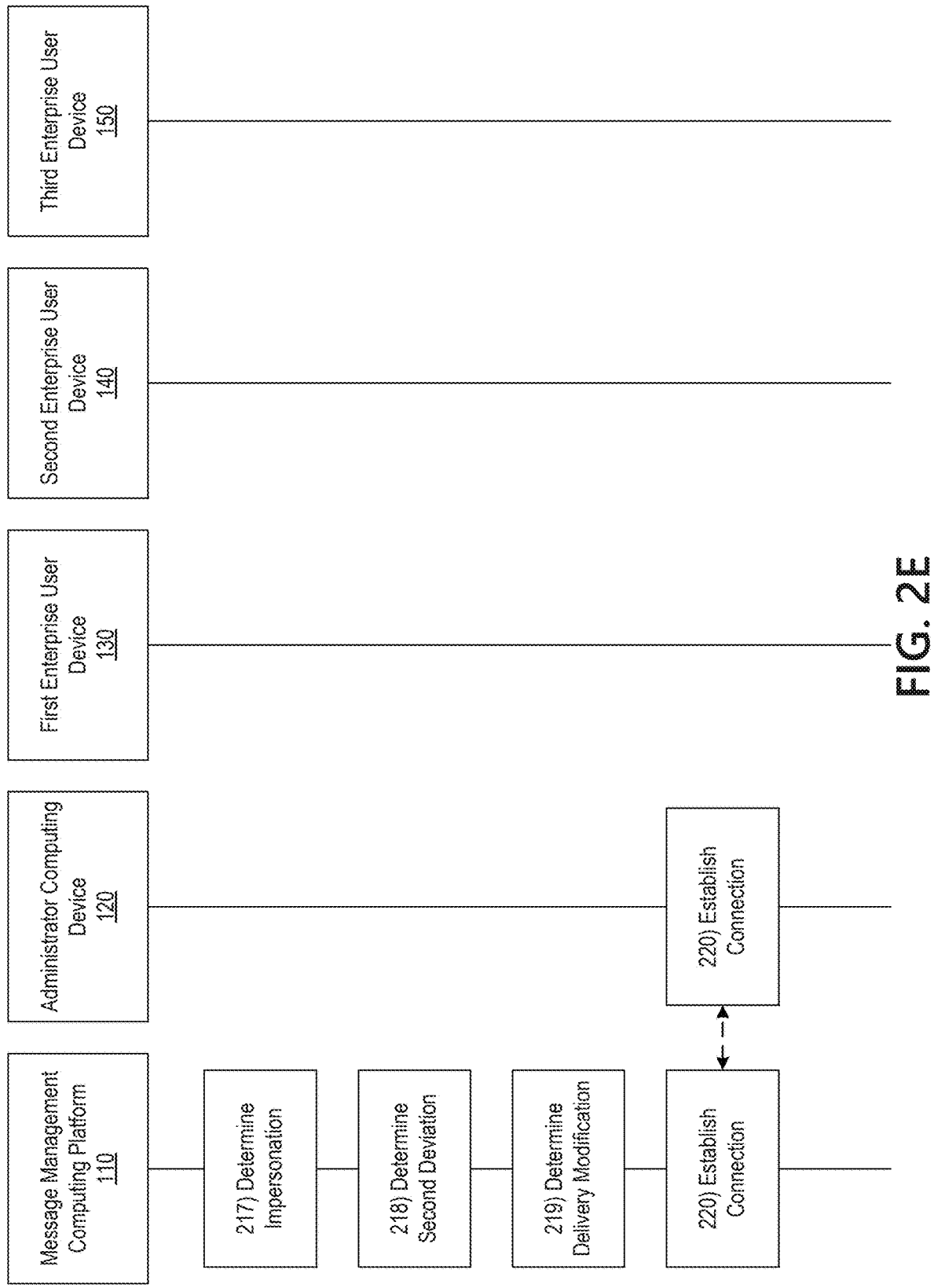

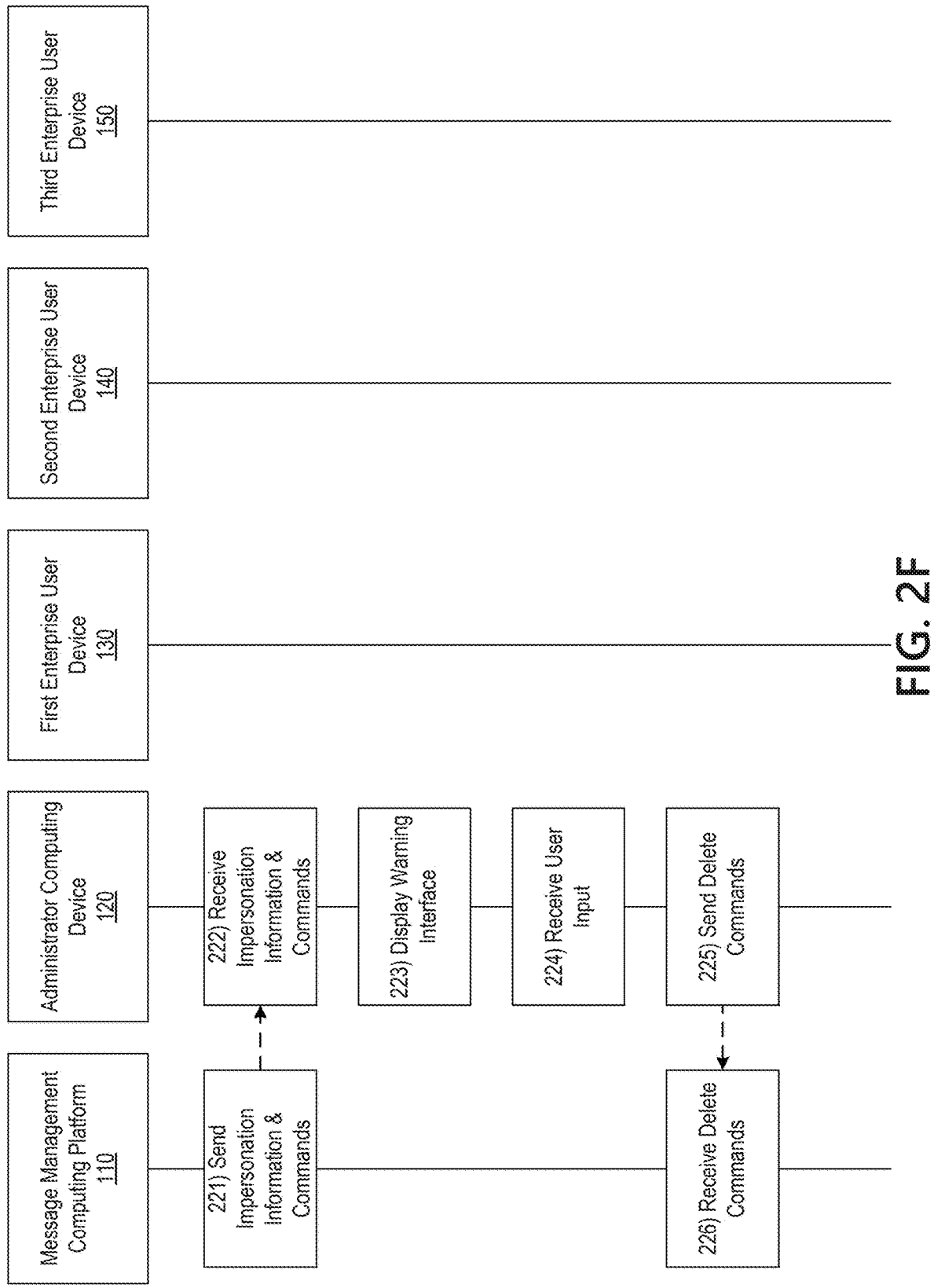

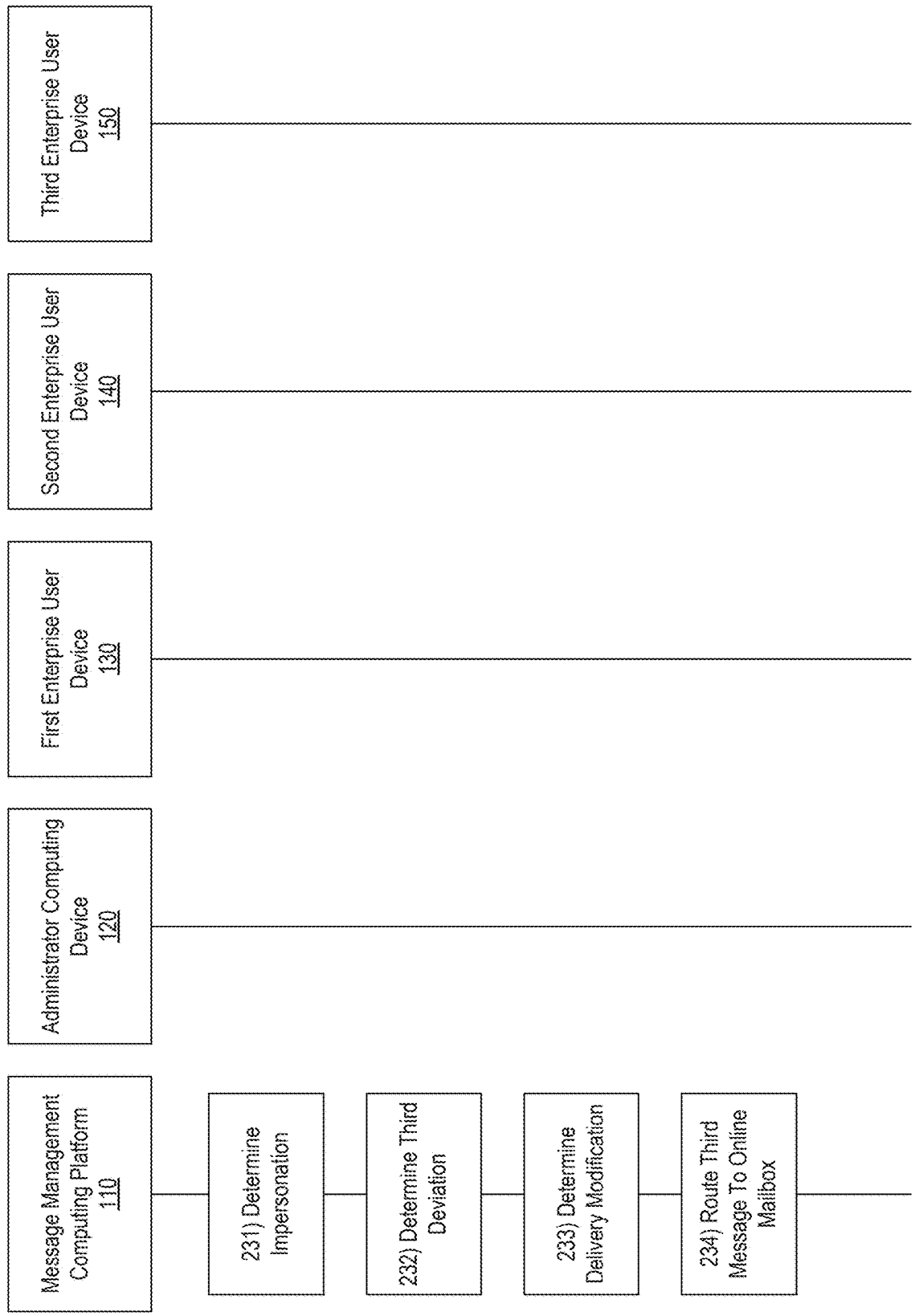

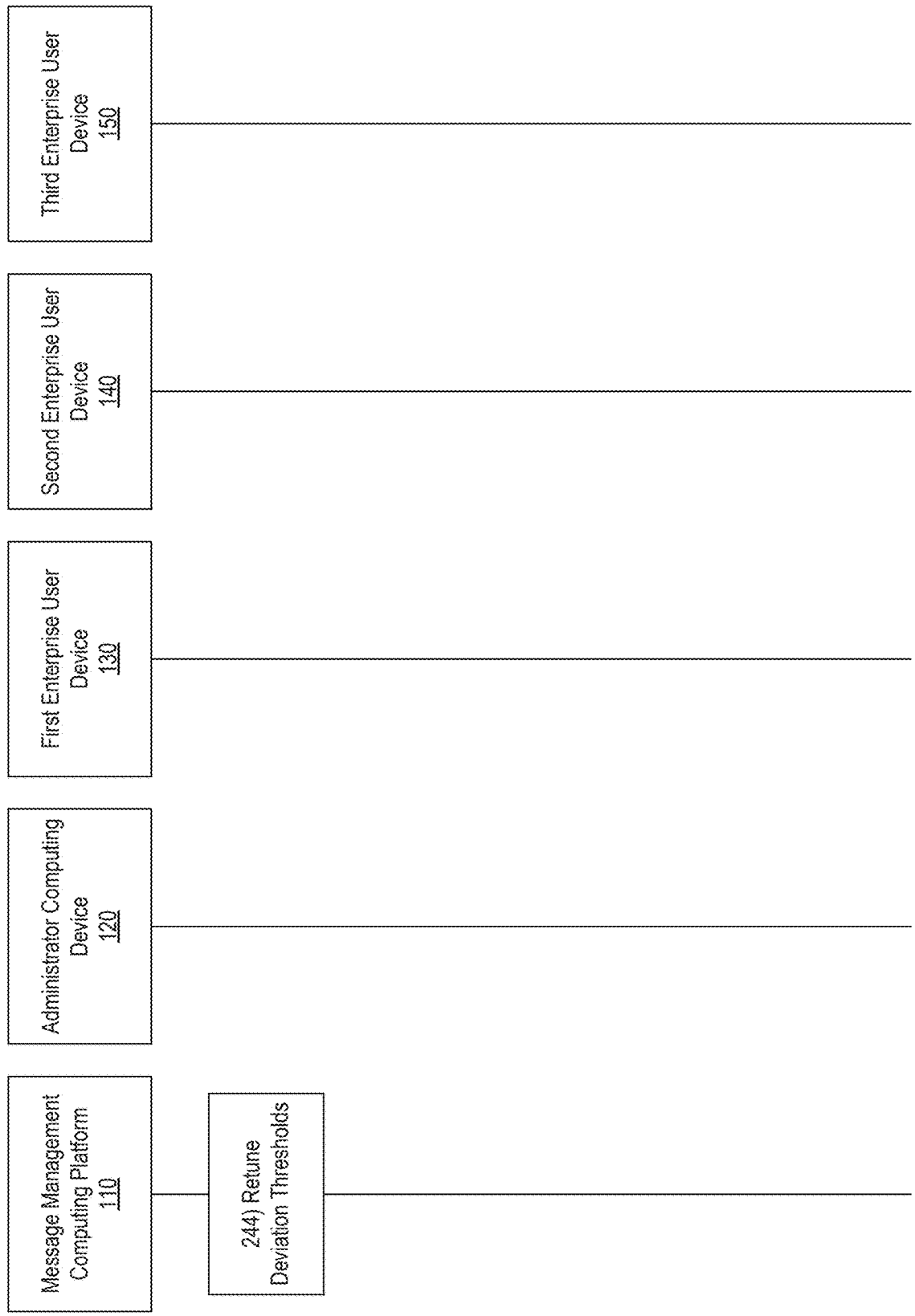

MESSAGE MANAGEMENT PLATFORM FOR PERFORMING IMPERSONATION ANALYSIS AND DETECTION

CROSS-REFERENCE TO RELATED APPLICATIONS

This application is a continuation of and claims priority to U.S. application Ser. No. 18/077,479, filed Dec. 8, 2022, and entitled, "Message Management Platform for Performing Impersonation Analysis & Detection," which is a continuation of and claims priority to U.S. application Ser. No. 16/697,918 (now U.S. Pat. No. 11,552,990), filed Nov. 27, 2019, and entitled "Message Management Platform for Performing Impersonation Analysis & Detection," which claims the benefit of and priority to U.S. Provisional Patent Application Ser. No. 62/815,088, filed Mar. 7, 2019, and entitled "Detecting Impersonation in Email Body Content Using Machine Learning," which are incorporated by reference herein in their entirety.

TECHNICAL FIELD

Aspects of the disclosure relate to message processing and management systems, data processing methods, machine learning systems, and communication systems and networks. In particular, one or more aspects of the disclosure relate to detecting impersonation in email body content using machine learning.

BACKGROUND

Increasingly, organizations face various cybersecurity threats through electronic communications. Various methods of message analysis have been developed to combat these threats. It remains difficult, however, to automatically identify messages that include impersonated content and/or that originate from a compromised user account due to an ability of impersonators to falsify fields and/or properties of the messages that are often used for impersonation detection. This is particularly true in circumstances where an entire user account has been compromised, as analysis of messages from the compromised user account might not reveal impersonation in these instances. These issues present substantial challenges with regard to external communications and, more importantly, with internal communications, which may, e.g., relate to authorizations, confidential information, or the like. Attempts to integrate such analysis techniques into efficient and effective automated processes present additional technical challenges, particularly when trying to balance and optimize information security against the consumption of the computing resources, such as processing power and network bandwidth, which may be used when applying these automated processes to large numbers of messages.

SUMMARY

Aspects of the disclosure provide technical solutions that overcome one or more of the technical problems described above and/or other technical challenges. For instance, one or more aspects of the disclosure relate to detecting impersonation in email body content using machine learning.

In accordance with one or more embodiments, a computing platform having at least one processor, a communication interface, and memory may, based on email data received from a plurality of user accounts, generate a plurality of user identification models, each specific to one of the user accounts. Next, the computing platform may intercept a first email message from a first user account of the plurality of user accounts to a second user account of the plurality of user accounts. Subsequently, the computing platform may apply a first model of the plurality of user identification models, specific to the first user account of the plurality of user accounts, to the first email message to calculate a first plurality of feature vectors for the first email message. In addition, the computing platform may apply one or more impersonation algorithms to the first plurality of feature vectors, which may indicate that the first email message comprises an impersonated message. Based on results of the one or more impersonation algorithms, the computing platform may modify delivery of the first email message.

In some embodiments, applying the one or more impersonation algorithms to the first plurality of feature vectors may result in a confidence score indicative of a likelihood that the first email message is an impersonated message. In some embodiments, the computing platform also may determine the results of the one or more impersonation algorithms. In these embodiments, the computing platform may determine that the confidence score exceeds a predetermined impersonation threshold. The computing platform may also determine a deviation value between the confidence score and the predetermined impersonation threshold. Lastly, the computing platform may compare the deviation value to a plurality of deviation thresholds, which may include a first deviation threshold, a second deviation threshold greater than the first deviation threshold, and a third deviation threshold greater than the second deviation threshold.

In some embodiments, the computing platform may determine that the deviation value does not exceed the first deviation threshold. Based on the determination that the deviation value does not exceed the first deviation threshold, the computing platform may determine alert information indicating that the first email message is an impersonated message. In these embodiments, the computing platform may modify delivery of the first message by sending, to a user device associated with the first user account, the alert information (which may cause the user device associated with the first user account to display an alert indicating that the first email message is an impersonated message) and may send, to a user device associated with the second user account, the first email message.

In some embodiments, the computing platform may modify delivery of the first message by modifying a subject line of the first email message prior to sending the first email message to the user device associated with the second user account. In some embodiments, the computing platform may receive, from the user device associated with the first user account, an indication that the first email message was not impersonated. Based on the indication that the first email message was not impersonated, the computing platform may update one or more machine learning datasets to indicate that the first email message was legitimate.

In some embodiments, the computing platform may determine that the deviation value exceeds the first deviation threshold but does not exceed the second deviation threshold. Based on the determination that the deviation value exceeds the first deviation threshold but does not exceed the second deviation threshold, the computing platform may determine that the first email message should be routed to an online mailbox configured to receive messages flagged as impersonated. In these embodiments, the online mailbox may be accessible by the user device associated with the second user account. Lastly, the computing platform may route the first email message to the online mailbox.

In some embodiments, the computing platform may determine that the deviation value exceeds the second deviation threshold but does not exceed the third deviation threshold. Based on the determination that the deviation value exceeds the second deviation threshold but does not exceed the third deviation threshold, the computing platform may determine that an administrator computing device should be notified that the first email message is an impersonated message. Subsequently, the computing platform may send, to the administrator computing device, impersonation alert information, which may cause the administrator computing device to display an impersonation warning interface.

In some embodiments, the computing platform may receive, from the administrator computing device, one or more commands directing the computing platform to delete the first email message. In one or more embodiments, the computing platform may determine that the deviation value exceeds the third deviation threshold. Based on the determination that the deviation value exceeds the third deviation threshold, the computing platform may determine that the first email message should be quarantined. Subsequently, the computing platform may prevent transmission of the first email message to the user device associated with the second user account.

In some embodiments, the computing platform may retune, based on one or more machine learning datasets comprising indications of identified impersonated messages, the plurality of deviation thresholds based on a target percentage of email messages to be flagged as impersonated. In some embodiments, the computing platform may intercept a second email message from a third user account of the plurality of user accounts to the second user account of the plurality of user accounts. The computing platform may apply a second model of the plurality of user identification models, specific to the third user account of the plurality of user accounts, to the second email message to calculate a second plurality of feature vectors for the second email message. The computing platform may apply the one or more impersonation algorithms to the second plurality of feature vectors, which may indicate that the second email message is a legitimate message. Based on results of the one or more impersonation algorithms, the computing platform may permit delivery of the second email message.

In some embodiments, the email data may be one or more of: a number of blank lines, a total number of lines, an average sentence length, an average word length, a vocabulary richness score, stop word frequency, a number of times one or more distinct words are used a single time, a total number of characters, a total number of alphabetic characters, a total number of upper-case characters, a total number of digits, a total number of white-space characters, a total number of tabs, a total number of punctuation marks, a word length frequency distribution, or a parts of speech frequency distribution. In some embodiments, the computing platform may determine the vocabulary richness score by determining a number of distinct words and a number of total words and then dividing the number of distinct words by the number of total words.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for detecting impersonation in email body content using machine learning in accordance with one or more example embodiments;

DETAILED DESCRIPTION

Figure 1:
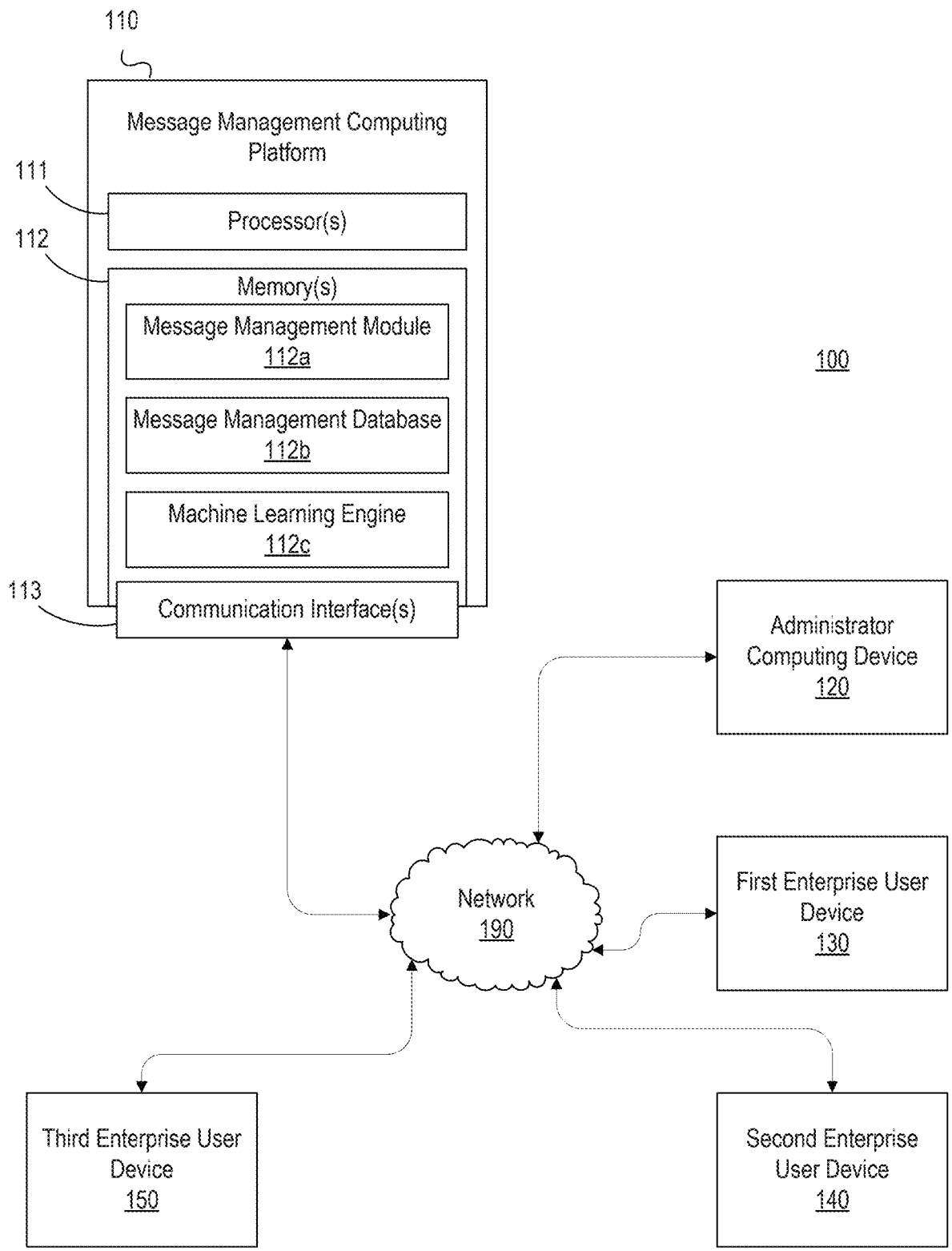
FIG. 1 depicts an illustrative operating environment for detecting impersonation in email body content using machine learning in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to detecting impersonation in email body content using machine learning. Various techniques may be used for detecting impersonation in emails. For example, computer programs may analyze email header information (e.g., header information identifying contents of message fields such as from, to, reply-to, subject, etc.) to determine if an email is compromised or not. Additionally or alternatively, computer programs may analyze whether established trusted relationships exist (e.g., has this author written to this recipient before, who does the author know that the recipient also knows, what is the frequency of interaction between the author and the recipient, or the like). Additionally or alternatively, if an email is received from an external address (e.g., an address outside of an organization, in contrast to an internal address inside the organization), computer programs may apply stricter levels of scrutiny to the email for impersonation detection. Additionally or alternatively, computer programs may use blacklist and typo squatting detection techniques and/or anti-spam functionality (e.g., blacklists, spam definition lexicons, internet protocol, domain reputation, or the like) in detecting impersonation.

However, if a user account has been compromised, one or more of these methods might not be as effective. One or more aspects of the disclosure provide enhanced methods for determining if a person writing an email from a particular user account is actually the person affiliated with that user account. In one or more instances, computing platforms may apply machine learning techniques to determine whether or not a writing style of the message is similar to a verified account holder. In these instances, computing platforms may analyze email characteristics such as a number of blank lines; a total number of lines; an average sentence length; an average word length (e.g., the number of characters); vocabulary richness (which may, e.g., be scored as the number of distinct words divided by the number of total words); stop word frequency distribution (e.g., the number of times stop words such as "if", "and," "the," or the like, are used); a number of times distinct words are used a single time; a total number of characters; a total number of alphabetic, upper-case, digits, white-space characters or the like that are used; a number of tabs; a number of punctuation marks; word length frequency distribution (e.g., like stop word distribution but with word length); parts of speech frequency distribution (verbs, adverbs, adjectives, nouns, etc.); or the like.

One or more aspects of the disclosure thus provide technical solutions to technical problems associated with maintaining security and privacy in electronic message communications. For example, by analyzing the text of a message to determine whether or not the author appears to be an impersonator, one or more of the methods described herein may provide a robust solution for impersonation detection that is effective regardless of whether or not a user account becomes compromised. Furthermore, one or more of the methods described herein may provide automated actions to modify message delivery in a plurality of ways based on a severity of a perceived threat. Furthermore, one or more of the methods described herein may increase internal network security by preventing malicious impersonation from persisting through messages sent and received within or to an enterprise network.

FIG. 1 depicts an illustrative operating environment for detecting impersonation in email body content using machine learning in accordance with one or more example embodiments. Referring to FIG. 1, computing environment 100 may include various computer systems, computing devices, networks, and/or other operating infrastructure. For example, computing environment 100 may include a message management computing platform 110, an administrator computing device 120, one or more enterprise user devices (e.g., first enterprise user device 130, second enterprise user device 140, and third enterprise user device 150), and a network 190.

Network 190 may include one or more wired networks and/or one or more wireless networks that interconnect impersonation detection platform 110, administrator computing device 120, first enterprise user device 130, second enterprise user device 140, third enterprise user device 150, and/or other computer systems and/or devices. In addition, each of message management computing platform 110, administrator computing device 120, first enterprise user device 130, second enterprise user device 140, and third enterprise user device 150 may be special purpose computing devices configured to perform specific functions, as illustrated in greater detail below, and may include specific computing components such as processors, memories, communication interfaces, and/or the like.

Message management computing platform 110 may include one or more processor(s) 111, one or more memory(s) 112, and one or more communication interface(s) 113. In some instances, message management computing platform 110 may be made up of a plurality of different computing devices, which may be distributed within a single data center or a plurality of different data centers. In these instances, the one or more processor(s) 111, one or more memory(s) 112, and one or more communication interface(s) 113 included in message management computing platform 110 may be part of and/or otherwise associated with the different computing devices that form message management computing platform 110.

In one or more arrangements, processor(s) 111 may control operations of message management computing platform 110. Memory(s) 112 may store instructions that, when executed by processor(s) 111, cause message management computing platform 110 to perform one or more functions, as discussed below. Communication interface(s) 113 may include one or more wired and/or wireless network interfaces, and communication interface(s) 113 may connect message management computing platform 110 to one or more networks (e.g., network 190) and/or enable message management computing platform 110 to exchange information and/or otherwise communicate with one or more devices connected to such networks.

In one or more arrangements, memory(s) 112 may store and/or otherwise provide a plurality of modules (which may, e.g., include instructions that may be executed by processor(s) 111 to cause message management computing platform 110 to perform various functions) and/or databases (which may, e.g., store data used by message management computing platform 110 in performing various functions). For example, memory(s) 112 may store and/or otherwise provide a message management module 112a, a message management database 112b, and a machine learning engine 112c. In some instances, message management module 112a may store instructions that cause message management computing platform 110 to identify potentially impersonated messages and to perform real time message delivery modification based on the extent of impersonation detected, and/or execute one or more other functions described herein. Additionally, message management database 112b may store data that is used by message management computing platform 110 in identifying potentially impersonated messages and performing real time message delivery modifications based on the extent of impersonation detected and/or in executing one or more other functions described herein. Furthermore, machine learning engine 112c may store instructions and/or data that may cause and/or be used by message management computing platform 110 to identify potentially impersonated messages, perform real time message delivery modifications, dynamically tune one or more deviation thresholds used to determine the message delivery modifications and/or execute one or more other functions described herein.

Administrator computing device 120 may be configured to be used by an administrative user (who may, e.g., be a network administrator of an electronic messaging provider and/or a cybersecurity analyst associated with an enterprise organization operating message management computing platform 110). Administrator computing device 120 may be configured to present one or more user interfaces associated with an operator dashboard, receive and/or display one or more alerts, and/or otherwise facilitate monitoring and management of one or more systems and/or devices included in computing environment 100.

First enterprise user device 130 may be configured to be used by a first user (who may e.g., be an employee of the enterprise organization operating message management computing platform 110 and/or an individual attempting to impersonate an employee of the enterprise organization operating message management computing platform 110). In some instances, first enterprise user device 130 may be configured to present one or more user interfaces associated with an electronic messaging application, receive input composing new messages, display content associated with received messages, display alerts, and/or otherwise facilitate sending, receiving, and/or otherwise exchanging messages and/or other data with one or more other enterprise user devices (e.g., second enterprise user device 140, third enterprise user device 150, or the like).

Second enterprise user device 140 may be configured to be used by a second user (who may e.g., be an employee of the enterprise organization operating message management computing platform 110 different from the user of first enterprise user device 130 and/or an individual attempting to impersonate an employee of the enterprise organization operating message management computing platform 110). In some instances, second enterprise user device 140 may be configured to present one or more user interfaces associated with an electronic messaging application, receive input composing new messages, display content associated with received messages, display alerts, and/or otherwise facilitate sending, receiving, and/or otherwise exchanging messages and/or other data with one or more other enterprise user devices (e.g., first enterprise user device 130, third enterprise user device 150, or the like).

Third enterprise user device 150 may be configured to be used by a third user (who may e.g., be an employee of the enterprise organization operating message management computing platform 110 different from the users of first enterprise user device 130 and second enterprise user device 140 and/or an individual attempting to impersonate an employee of the enterprise organization operating message management computing platform 110). In some instances, third enterprise user device 150 may be configured to present one or more user interfaces associated with an electronic messaging application, receive input composing new messages, display content associated with received messages, display alerts, and/or otherwise facilitate sending, receiving, and/or otherwise exchanging messages and/or other data with one or more other enterprise user devices (e.g., first enterprise user device 130, second enterprise user device 140, or the like).

Figure 2G:
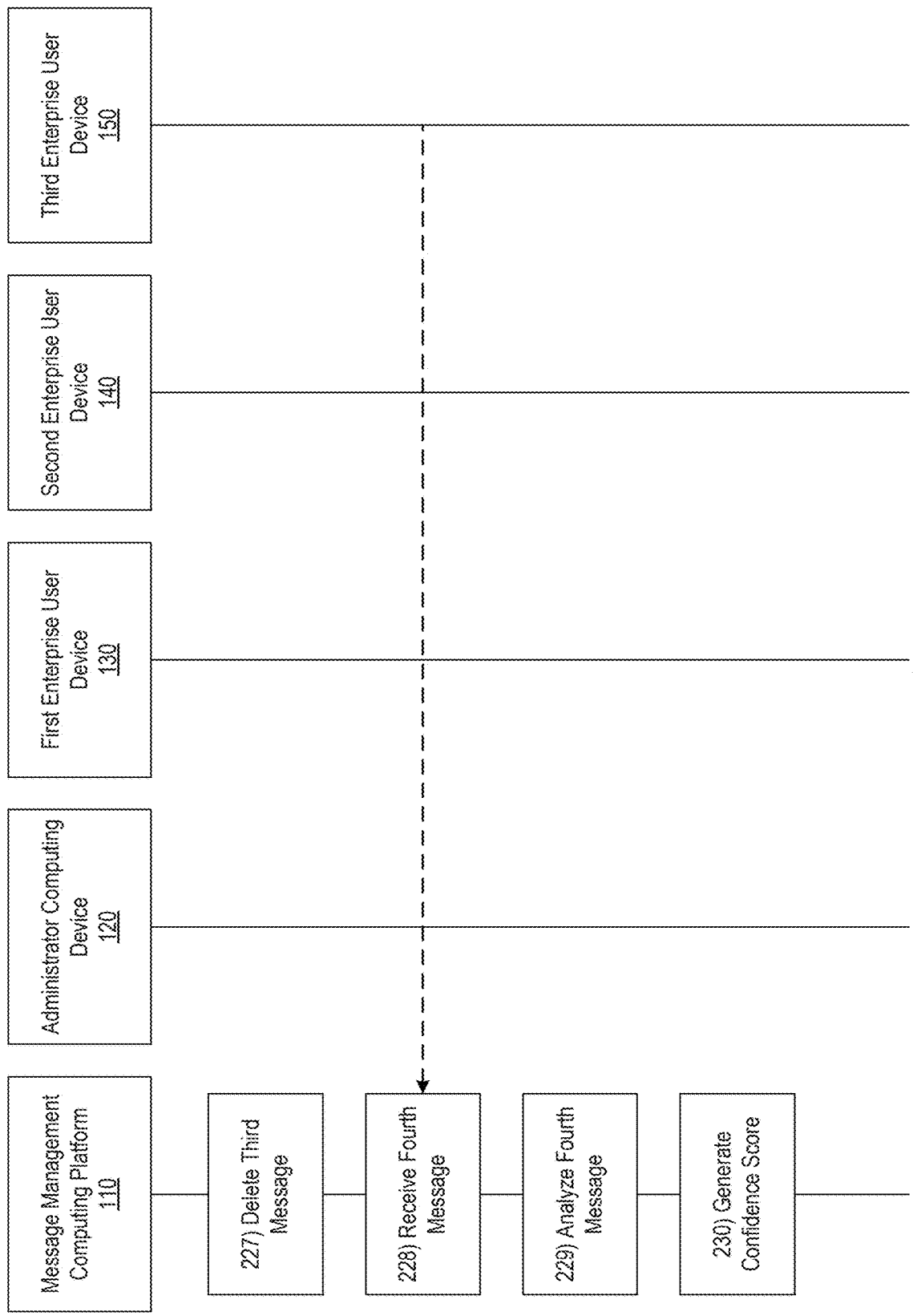

FIGS. 2A-2K depict an illustrative event sequence for detecting impersonation in email body content using machine learning in accordance with one or more example embodiments. Referring to FIG. 2A, at step 201, message management computing platform 110 may load message data associated with one or more user accounts. In some instances, in loading the message data associated with the one or more user accounts, the message management computing platform 110 may load message data already stored at the message management computing platform 110 (e.g., by way of historical facilitation of message transmission between enterprise user devices). Alternatively, the message management computing platform 110 may receive and subsequently load message data from the enterprise user devices (e.g., first enterprise user device 130, second enterprise user device 140, third enterprise user device 150, or the like) themselves.

In one or more instances, in loading the message data associated with the one or more user accounts, the message management computing platform 110 may load all message data associated with the one or more user accounts. In other instances, in loading the message data associated with the one or more user accounts, the message management computing platform 110 may load historical message data based on a predetermined time period (e.g., one month, six months, one year, or the like). In these instances, the predetermined time period may be automatically determined by the message management computing platform 110 (e.g., an ideal time period that balances accuracy with computing load, data management, and/or data storage) or may be specified based on a received user input. In one or more instances, in loading the message data associated with the one or more user accounts, the message management computing platform 110 may receive message data associated with one or more employees of the enterprise organization operating message management computing platform 110. In loading the message data associated with the one or more user accounts, the message management computing platform 110 may load any type of message data (e.g., email, text, instant message, or the like).

At step 202, message management computing platform 110 may generate a plurality of user identification models. In doing so, the message management computing platform 110 may generate a unique user identification model for each user (e.g., each employee of the enterprise organization operating message management computing platform 110). In generating the plurality of user identification models, the message management computing platform 110 may strip out text from the message data loaded at step 201. Subsequently, the message management computing platform 110 may analyze the message data, received at step 201, for each user and may generate a plurality of baseline metrics associated with the corresponding user that are indicative of his or her unique writing style. For example, in generating the plurality of user identification models, the message management computing platform 110 may determine one or more of the following metrics for each message associated with the message data loaded at step 201: a number of blank lines, a total number of lines, an average sentence length (e.g., number of characters, or the like), vocabulary richness (e.g., V/M, where V=a number of distinct (e.g., uncommon, or the like) words and M=a total number of words), a stop word frequency distribution (e.g., a number of times a stop word (e.g., "if," "and," "the," or the like) is used), a number of times distinct words are used exactly once, a total number of characters, a total number of alphabetic characters, a total number of upper-case characters, a total number of digits, a total number of white-space characters, a number of tabs, a number of punctuation marks, a word length frequency distribution (e.g., how many times words of a particular length are used), parts of speech frequency distribution (e.g., how many verbs, adverbs, adjectives, nouns, or the like are used), or the like. In one or more instances, in addition to determining these metrics for each message, the message management computing platform 110 may generate average values for one or more of the above described metrics (e.g., based on all message data associated with a particular user). After generating the plurality of baseline metrics, the message management computing platform 110 may store the baseline metrics, along with an identity of their associated user (e.g., the transmitting user's account), as user identification models. In one or more instances, in storing the user identification models, the message management computing platform 110 may store one or more feature vectors for each user identification model that contain the baseline metrics determined at step 202. By using the metrics described above for message analysis, model construction, and feature vector generation, the message management computing platform 110 may optimize a balance between accuracy of impersonation detection with conservation of bandwidth and computing resources. In one or more instances, depending on available computing resources (e.g., available storage and/or processing power), the message management computing platform 110 may prioritize certain metrics for collection and/or analysis (e.g., based on a determination that the certain metrics are more effective than the remaining metrics in impersonation detection).

In one or more instances, once the message management computing platform 110 generates the plurality of user identification models, it might not repeat step 202 as additional messages are received (e.g., which may conserve computing resources and/or network bandwidth). In other instances, the message management computing platform 110 may dynamically update the plurality of user identification models in real time as additional messages are received (e.g., which may result in more accurate impersonation detection). For example, the message management computing platform 110 may update the plurality of user identification models to include slang and/or other language based on life events (e.g., a user got married, had a baby, or the like). Additionally or alternatively, the message management computing platform 110 may update the plurality of user identification models during a particular time period, and then revert back to the original plurality of user identification models once the particular time period has lapsed (e.g., during and then after the holiday season, or the like).

At step 203, the message management computing platform 110 may receive or otherwise access a first message. For example, the message management computing platform 110 may receive a first email message from first enterprise user device 130. In one or more instances, if a connection has not been established between the first enterprise user device 130 and the message management computing platform 110, the first enterprise user device 130 may establish a first data connection with the message management computing platform 110 to link the first enterprise user device 130 to the message management computing platform 110. In these instances, the message management computing platform 110 may receive the first email message via the communication interface 113 and while the first data connection is established. In one or more instances, in receiving the first message, the message management computing platform 110 may intercept the first message from the first enterprise user device 130 before it is received at the second enterprise user device 140.

At step 204, the message management computing platform 110 may analyze the first email message using the one or more user identification models generated at step 202. For example, in analyzing the first email message, the message management computing platform 110 may identify a user account (e.g., a first user account) associated with the first email message (e.g., based on a sender field associated with the first email message), and may determine a plurality of metrics associated with the first email message similar to those described above at step 202 with regard to determination of the user identification models. In one or more instances, in determining the plurality of metrics associated with the first email message, the message management computing platform 110 may generate one or more feature vectors, corresponding to the first email message, which contain the plurality of metrics. After determining the plurality of metrics associated with the first email message, the message management computing platform 110 may load the user identification model corresponding to the user account associated with the first email message, and may apply the loaded user identification model to the first email message by comparing the plurality of metrics associated with the first email message to the model associated with the user account of the sender of the first email message. In one or more instances, in comparing the plurality of metrics associated with the first email message to the model associated with the user account of the sender of the first email message, the message management computing platform 110 may compare the feature vectors corresponding to the first email message to the feature vectors corresponding to the user identification model of the first user account. For example, the message management computing platform 110 may calculate distance values between the feature vectors corresponding to the first email message and the feature vectors corresponding to the user identification model of the first user account. For instance, the message management computing platform 110 may determine whether, among other things, the first email message contains sentences that deviate substantially in length from the average sentence length written by the true user of the first user account.

In one or more instances, in addition or as an alternative to analyzing the body of a message, the message management computing platform 110 may analyze an earlier message in an email chain. For example, a first user may send a message to a second user, and the second user may reply to the message while adding a third user to the reply as an additional recipient. In this example, the message management computing platform 110 may analyze text from the first user's original message once it is sent on to the third user by the second user (e.g., message management computing platform 110 may analyze the message chain). In other instances, to conserve processing resources and reduce processing time, the message management computing platform 110 might not recheck text that has already been analyzed (e.g., the first user's original message would have been analyzed when it was initially sent, so message management computing platform 110 might not reanalyze). However, in these instances, the message management computing platform 110 may determine whether a modification was made to the original message, and if so, the message management computing platform 110 may analyze any added text using a user identification model associated with the alleged author of that added text. For example, the first user may have posed a series of questions in the original message and the second user may add replies to each question in the original message and may write something to the effect of "see my replies in your message below." In this example, the message management computing platform 110 may use a user identification model associated with the second user account to analyze the reply message from the second user account as well as the replies that are located in the body of the original email from the first user account (e.g., the message management computing platform 110 may strip out text of the original email from the first user account).

Referring to FIG. 2B, at step 205, the message management computing platform 110 may generate a confidence score based on the results determined at step 204. In determining the confidence score, the message management computing platform 110 may generate a score indicative of a correlation between the first email message and the first user account. For example, if many (e.g., more than a predetermined amount) of the plurality of metrics associated with the first email message do not match the model for the first user account (e.g., because the calculated distance values for such metrics exceed predetermined threshold amounts), the message management computing platform 110 may determine a low confidence score (e.g., 2/10), thus indicating that the user of the first user account has likely been impersonated. In some instances, in determining that a user has impersonated, the message management computing platform 110 may determine instances where a valid user has had his or her credentials stolen and an impersonator now is sending impersonated messages from the valid user's account. Alternatively, in determining that a user has been impersonated, the message management computing platform 110 may determine that text from an earlier message in an email chain has been maliciously modified before being sent to a subsequent recipient, thus impersonating the sender of the earlier message. Alternatively, if many (e.g., more than another predetermined amount) of the plurality of metrics associated with the first email message do match the user identification model for the first user account (e.g., because the calculated distance values are within a predetermined acceptable range or tolerance), the message management computing platform 110 may determine a high confidence score (e.g., 9/10), thus indicating that the legitimate user of the first user account likely composed the first email message.

With regard to step 205 of the example event sequence, it may be assumed for illustrative purposes that the message management computing platform 110 determined that the results determined from step 204 had a high correlation to the user identification model for first user account, and thus the message management computing platform 110 generated a high confidence score for the first email message (e.g. 9/10).

At step 206, the message management computing platform 110 may apply one or more impersonation algorithms to the confidence score, generated at step 205, to determine whether or not the first email message was impersonated. In one or more instances, in applying the one or more impersonation algorithms, the message management computing platform 110 may compare the confidence score, generated at step 205, to a predetermined impersonation threshold. In one or more instances, the message management computing platform 110 may automatically determine the predetermined impersonation threshold (e.g., using one or more machine learning algorithms to determine an optimal threshold value) and/or based on user input. For example, the message management computing platform 110 may determine that any confidence score that falls below a seven is likely associated with an impersonation and any confidence score that is seven or above is likely associated with a legitimate message. Additionally or alternatively, the message management computing platform 110 may determine multiple predetermined impersonation thresholds. For example, the message management computing platform 110 may determine a first predetermined impersonation threshold (e.g., 4/10), and may automatically determine that messages associated with confidence scores below this threshold are impersonated. In this example, the message management computing platform 110 may also determine a second predetermined impersonation threshold, larger than the first (e.g., 7/10), and may determine that messages with confidence scores in the range between the first and second predetermined impersonation thresholds may be impersonated, but should be flagged and routed for additional review and/or further scrutiny. In one or more instances, the number of predetermined impersonation thresholds and the resulting actions associated with each threshold may be configured by an administrator for the enterprise organization operating message management computing platform 110. In one or more instances, in applying the one or more impersonation algorithms, the message management computing platform 110 may apply one or more of a soft maximum algorithm, a support vector machine algorithm, a deep learning algorithm, or the like.

In some arrangements, steps 204-206 may alternatively be performed at a user device (e.g., first enterprise user device 130, second enterprise user device 140, third enterprise user device 150, or the like) as a message is sent. In these instances, user specific models may be stored at each user device that correspond to a user of the respective devices. Additionally or alternatively, the user devices may access stored models that may correspond to one or more user accounts that may be accessed via the respective user device. This configuration may, for instance, allow analysis of multiple users on the same user device.

For the purposes of this illustrative event sequence, the message management computing platform 110 may determine at step 206 that because the confidence score generated at step 205 (e.g., 9/10) exceeds the predetermined impersonation threshold (e.g., 6/10), the first email message is a legitimate message and was not impersonated. Accordingly, after determining that the first email message is a legitimate message, the message management computing platform 110 may route the first email message to its intended recipient (e.g., a second user account that may be accessed by, for example, second enterprise user device 140).

At step 207, the message management computing platform 110 may receive or otherwise access a second message. For example, in receiving the second message, the message management computing platform 110 may receive a second email message from the third enterprise user device 150. In one or more instances, if a connection has not previously been established between the message management computing platform 110 and the third enterprise user device 150, the third enterprise user device 150 may establish a second data connection with the message management computing platform 110 to link the third enterprise user device 150 to the message management computing platform 110. In these instances, the message management computing platform 110 may receive the second email message via the communication interface 113 and while the second data connection is established. In one or more instances, in receiving the second message, the message management computing platform 110 may intercept the second message from the third enterprise user device 150 before it is sent to the second enterprise user device 140.

At step 208, the message management computing platform 110 may analyze the second email message. For example, in analyzing the second email message, the message management computing platform 110 may perform steps similar to those described above with regard to analysis of the first email message at step 204. For illustrative purposes, however, the message management computing platform 110 may determine at step 208 that a user account corresponding to a sender of the second email message (e.g., a third user account) is different than the user account identified as the sender of the first email message (e.g., the first user account). As a result, the message management computing platform 110 may load a user identification model associated with the third user account as opposed to the user identification model (corresponding to the first user account) used at step 204.

Referring to FIG. 2C, at step 209, message management computing platform 110 may generate a confidence score based on the results determined at step 208 (a second confidence score). In one or more instances, in generating the second confidence score, the message management computing platform 110 may perform steps similar to those described above with regard to generation of the confidence score at step 205. For illustrative purposes, however, it may be assumed that at step 209, the message management computing platform 110 determined that the results from step 208 had a low correlation to the user identification model for the third user account, and thus the message management computing platform 110 generated a low confidence score for the second email message (e.g. 2/10).

At step 210, the message management computing platform 110 may apply one or more impersonation algorithms to the second confidence score, generated at step 209, to determine whether or not the second email message was impersonated. In applying the one or more impersonation algorithms, the message management computing platform 110 may perform one or more actions similar to those described above with regard to step 206. For illustrative purposes, however, the message management computing platform 110 may determine at step 210 that the confidence score does not exceed the predetermined impersonation threshold, and so may determine that the second email message is likely impersonated.

At step 211, the message management computing platform 110 may determine a first deviation value in response to determining, at step 210, that the second email message was likely impersonated. In determining the first deviation value, the message management computing platform 110 may determine a deviation value between the second confidence score and the predetermined impersonation threshold. For example, the higher the deviation is between a confidence score and the predetermined impersonation threshold (as determined by the message management computing platform 110), the impersonation may be more severe and/or malicious and thus the message management computing platform 110 may determine increasingly severe modifications to transmission of the messages as such deviation values increase.

In determining the first deviation value, the message management computing platform 110 may first compute a variance between the second confidence score and the predetermined impersonation threshold:

$$\sigma^2 = \frac{(x_1 - \mu)^2 + \ldots + (x_N - \mu)^2}{N} = \frac{(2-4)^2 + (6-4)^2}{2} = 4$$

Then to determine the standard deviation, the message management computing platform 110 may take the square root of the variance:

$$\sigma = \sqrt{\text{variance}} = \sqrt{4} = 2$$

Thus, in the example illustrated in the example event sequence, the message management computing platform 110 may determine a first deviation value of two.

At step 212, based on the first deviation value, the message management computing platform 110 may determine a delivery modification. For example, in determining the delivery modification, the message management computing platform 110 may determine security measures to implement in response to the severity of the determined impersonation. In determining the delivery modification, the message management computing platform 110 may determine how the first deviation value compares to one or more deviation thresholds. For example, the message management computing platform 110 may determine three deviation thresholds (e.g., a first deviation threshold, a second deviation threshold lower than the first deviation threshold, and a third deviation threshold lower than the second deviation threshold) and may determine a new delivery modification each time a new deviation threshold is reached and/or exceeded. In one or more instances, the message management computing platform 110 may automatically determine the one or more deviation thresholds or may determine the one or more deviation thresholds based on user input. Additionally or alternatively, the message management computing platform 110 may determine the one or more deviation thresholds so that target specific percentages of a total number of impersonated messages are determined to exceed each threshold. For example, the message management computing platform 110 may target the following breakdown of deviation values: 25% exceed the first deviation threshold, 25% exceed the second deviation threshold but do not exceed the first deviation threshold, 25% exceed the third deviation threshold but do not exceed the second deviation threshold, and 25% do not exceed the third deviation threshold. In one or more instances, the message management computing platform 110 may dynamically modify the deviation thresholds based on these target percentages. Additionally or alternatively, the message management computing platform 110 may modify the percentages themselves (e.g., based on a decision to increase or decrease a level of scrutiny in message review). In doing so, the message management computing platform 110 may dynamically manage delivery modifications and increase or decrease a level of scrutiny on the fly, which may e.g., improve network security and/or server load balancing.

In this example, the message management computing platform 110 may determine that the first deviation threshold is two, and thus the first deviation value is greater than or equal to the largest deviation threshold. Accordingly, the message management computing platform 110 may determine that the second email message should be quarantined (e.g., prevented from reaching its intended recipient). Additionally or alternatively, the message management computing platform 110 may determine that any other messages originating from the third user account and/or the third enterprise user device 150 should also be quarantined.

Referring to FIG. 2D, at step 213, the message management computing platform 110 may quarantine the second message after determining, at step 212, that the second email message should be quarantined. Additionally or alternatively, the message management computing platform 110 may quarantine all other messages originating from the third user account (e.g., prevent all messages transmitted from the third user account from reaching their intended recipients) and/or may disable the third enterprise user device 150 (e.g., send one or more network commands to isolate the third enterprise user device 150 from an internal network associated with the enterprise organization that controls the message management computing platform 110).

At step 214, the message management computing platform 110 may receive a third message (e.g., a third email message). In one or more instances, in receiving the third email message from the third enterprise user device 150, the message management computing platform 110 may receive a message from a user account different than the third user account described above at step 207 (e.g., multiple user accounts may be accessed via third enterprise user device 150). For the illustrative purposes of the event sequence shown in FIGS. 2A-2K, it should be understood that, in this example, steps 214-227 are occurring once network security issues associated with the third user account (e.g., quarantine of the second message, the third user account, and/or the third enterprise user device 150) have been addressed (e.g., steps 214-227 may describe management of a new and/or different instance of impersonation). In one or more instances, in receiving the third message, the message management computing platform 110 may intercept the third message from the third enterprise user device 150 before it is received by the second enterprise user device 140.

In one or more instances, in receiving the third email message, the message management computing platform 110 may receive the third email message while the second data connection is established and via the communication interface 113. In one or more instances, actions performed at step 214 may be similar to those described above with regard to step 207.

At step 215, the message management computing platform 110 may analyze the third email message. For example, in analyzing the third email message, the message management computing platform 110 may perform steps similar to those described above with regard to analysis of the first email message and the second email message at steps 204 and 208.

At step 216, message management computing platform 110 may generate a confidence score based on the results determined at step 215 (a third confidence score). In one or more instances, in generating the third confidence score, the message management computing platform 110 may perform steps similar to those described above with regard to generation of the confidence scores at steps 205 and 209. For illustrative purposes, however, it may be assumed that at step 216, the message management computing platform 110 determined that the results from step 215 had a low correlation to the user identification model for the third user account, but nevertheless had a higher correlation to the user identification model for the third user account than the correlation determined at step 209. For example, the message management computing platform 110 may generate a third confidence score of 3/10 for the third email message.

Referring to FIG. 2E, at step 217, the message management computing platform 110 may apply one or more impersonation algorithms to the third confidence score, generated at step 216, to determine whether or not the third email message was impersonated. In applying the one or more impersonation algorithms, the message management computing platform 110 may perform one or more actions similar to those described above with regard to step 210.

At step 218, the message management computing platform 110 may determine a second deviation value in response to determining, at step 217, that the third email message was likely impersonated. In determining the second deviation value, the message management computing platform 110 may perform steps similar to those described above at step 211 with regard to the determination of the first deviation value. For illustrative purposes, however, the message management computing platform 110 may, at step 218, determine a deviation value between the third confidence score and the predetermined impersonation threshold.

In determining the second deviation value, the message management computing platform 110 may first compute a variance between the third confidence score and the predetermined impersonation threshold:

$$\sigma^2 = \frac{(x_1 - \mu)^2 + \ldots + (x_N - \mu)^2}{N} = \frac{(3 - 4.5)^2 + (6 - 4.5)^2}{2} = 2.25$$

Then to determine the standard deviation, the message management computing platform 110 may take the square root of the variance:

$$\sigma = \sqrt{\text{variance}} = \sqrt{2.25} = 1.5$$

Thus, in the example illustrated in the example event sequence, the message management computing platform 110 may determine a second deviation value of 1.5.

At step 219, based on the second deviation value, the message management computing platform 110 may determine a second delivery modification. In determining the second delivery modification, the message management computing platform 110 may perform actions similar to those performed at step 212 with regard to determination of the first delivery modification. For illustrative purposes, however, the message management computing platform 110 may determine at step 219 that the second deviation value does not exceed the first deviation threshold, but does exceed the second deviation threshold. Accordingly, the message management computing platform 110 may determine that the administrator computing device 120 should be notified of the detected impersonation in the third email message.

At step 220, based on the determination at step 219 that the administrator computing device 120 should be notified of the impersonation in the third email message, the message management computing platform 110 may establish a connection with the administrator computing device 120. In one or more instances, the message management computing platform 110 may establish a third data connection with the administrator computing device 120 to link the message management computing platform 110 to the administrator computing device 120. In one or more instances, the message management computing platform 110 may determine whether a connection was previously established with the administrator computing device 120. If the message management computing platform 110 determines that a connection with the administrator computing device 120 was previously established, the message management computing platform 110 might not reestablish the connection with the administrator computing device 120. If the message management computing platform 110 determines that a connection was not previously established, the message management computing platform 110 may establish a third data connection with the administrator computing device 120 to link the message management computing platform 110 to the administrator computing device 120.

Referring to FIG. 2F, at step 221, the message management computing platform 110 may generate impersonation indication information and one or more commands directing the administrator computing device 120 to display an impersonation warning interface based on the impersonation indication information. In one or more instances, the message management computing platform 110 may send, share, or otherwise provide the impersonation indication information, and the one or more commands directing the administrator computing device 120 to display the impersonation warning interface, to the administrator computing device 120 via the communication interface 113 and while the third data connection is established.

At step 222, the administrator computing device 120 may receive or otherwise access the impersonation indication information and the one or more commands directing the administrator computing device 120 to display an impersonation warning interface based on the impersonation indication information. In one or more instances, the administrator computing device 120 may receive the impersonation indication information and the one or more commands directing the administrator computing device 120 to display an impersonation warning interface while the third data connection is established.

Figure 3:
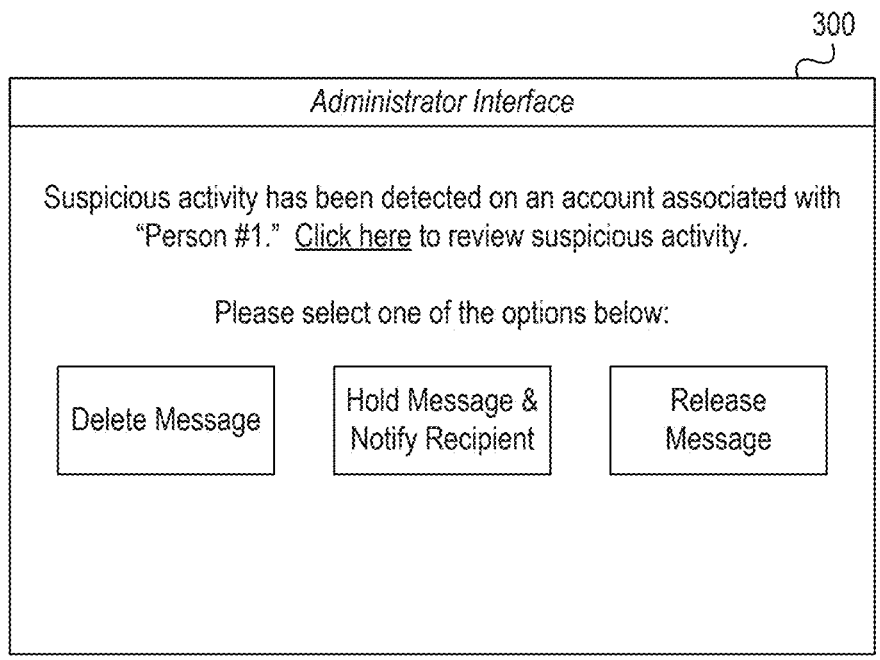
FIGS. 3 and 4 depict illustrative user interfaces for detecting impersonation in email body content using machine learning in accordance with one or more example embodiments.

At step 223, the administrator computing device 120 may generate and display a warning interface based on the impersonation information and the one or more commands directing the administrator computing device 120 to display an impersonation warning interface. In one or more instances, in generating the impersonation warning interface, the administrator computing device 120 may display a user interface similar to graphical user interface 300, which is illustrated in FIG. 3. For example, the administrator computing device 120 may generate an administrator interface indicating that suspicious activity has been detected at a particular user account (e.g., the third user account). In some instances, the administrator computing device 120 may provide options to review the suspicious activity (e.g., route to a particular folder or user to perform a manual review of the flagged message to identify impersonation), delete the flagged message (e.g., the third email message), hold the flagged message (e.g., the third email message) and notify a recipient (e.g., a user of the second user account), and/or simply release the flagged message (e.g., the third email message) to the intended recipient (e.g., the second user account).

At step 224, the administrator computing device 120 may receive user input via a display of the administrator computing device 120. For example, the administrator computing device 120 may receive a user input selecting one of the options described above at step 223 with regard to the graphical user interface 300 (e.g., delete message, hold message/notify recipient, release message, or the like). For purposes of the illustrative event sequence described herein, it may be assumed that at step 224, the administrator computing device 120 received user input (e.g., from an administrative employee of the enterprise organization in control of the message management computing platform 110) indicating that the third email message should be deleted.

At step 225, based on the user input received at step 224, the administrator computing device 120 may generate and send one or more commands directing the message management computing platform 110 to delete the third email message. In one or more instances, the administrator computing device 120 may send, share, or otherwise provide the one or more commands directing the message management computing platform 110 to delete the third email message to the message management computing platform 110 while the third data connection is established.

At step 226, the message management computing platform 110 may receive the one or more commands directing the message management computing platform 110 to delete the third email message. In one or more instances, the message management computing platform 110 may receive or otherwise access the one or more commands directing the message management computing platform 110 to delete the third email message while the third data connection is established and via the communication interface 113.

Referring to FIG. 2G, at step 227, in response to the one or more commands directing the message management computing platform 110 to delete the third email message, the message management computing platform 110 may delete the third email message. In some instances, in deleting the third email message, the message management computing platform 110 may notify the sender (e.g., third user account) and/or the intended recipient (e.g., second user account) that the message was deleted in response to detected impersonation.

At step 228, the message management computing platform 110 may receive a fourth message (e.g., a fourth email message). In one or more instances, in receiving the fourth email message from the third enterprise user device 150, the message management computing platform 110 may receive a message from a user account different than the third user account described above at steps 207-227 (e.g., multiple user accounts may be accessed via third enterprise user device 150). For the illustrative purposes of the event sequence shown in FIGS. 2A-2K, it should be understood that steps 228-234 are occurring once network security issues associated with the third user account (e.g., notification of the administrator computing device 120) have been addressed (e.g., steps 228-234 may describe management of a new/different instance of impersonation). In one or more instances, the message management computing platform 110 may receive the fourth email message via the communication interface 113 and while the second data connection is established. In one or more instances, in receiving the fourth message, the message management computing platform 110 may intercept the fourth message from the third enterprise user device 150 before it is received by the second enterprise user device 140.

At step 229, the message management computing platform 110 may analyze the fourth email message. For example, in analyzing the fourth email message, the message management computing platform 110 may perform steps similar to those described above with regard to analysis of the first, second, and third email messages at steps 204, 208, and 215 respectively.

At step 230, message management computing platform 110 may generate a confidence score based on the results determined at step 229 (a fourth confidence score). In one or more instances, in generating the fourth confidence score, the message management computing platform 110 may perform steps similar to those described above with regard to generation of the confidence scores at steps 205, 209, and 216. For illustrative purposes, however, it may be assumed that at step 230, the message management computing platform 110 determined that the results from step 229 had a low correlation to the user identification model for the third user account, but nevertheless had a higher correlation to the user identification model for the third user account than the correlations determined at steps 209 and 216. For example, the message management computing platform 110 may generate a fourth confidence score of 4/10 for the fourth email message.

Referring to FIG. 2H, at step 231, the message management computing platform 110 may apply one or more impersonation algorithms to the fourth confidence score, generated at step 230, to determine whether or not the fourth email message was impersonated. In applying the one or more impersonation algorithms, the message management computing platform 110 may perform one or more actions similar to those described above with regard to step 210 and 217.

At step 232, the message management computing platform 110 may determine a third deviation value in response to determining, at step 231, that the fourth email message was likely impersonated. In determining the third deviation value, the message management computing platform 110 may perform steps similar to those described above at steps 211 and 218 with regard to the determination of the first and second deviation values. For illustrative purposes, however, the message management computing platform 110 may, at step 232, determine a deviation value between the fourth confidence score and the predetermined impersonation threshold.

In determining the third deviation value, the message management computing platform 110 may first compute a variance between the fourth confidence score and the predetermined impersonation threshold:

$$\sigma^2 = \frac{(x_1 - \mu)^2 + \ldots + (x_N - \mu)^2}{N} = \frac{(4-5)^2 + (6-5)^2}{2} = 1$$

Then to determine the standard deviation, the message management computing platform 110 may take the square root of the variance:

$$\sigma = \sqrt{\text{variance}} = \sqrt{1} = 1$$

Thus, in the example illustrated in the example event sequence, the message management computing platform 110 may determine a third deviation value of one.

At step 233, based on the third deviation value, the message management computing platform 110 may determine a third delivery modification. In determining the third delivery modification, the message management computing platform 110 may perform actions similar to those described above at steps 212 and 219 with regard to determination of the first and second delivery modifications. For illustrative purposes, however, the message management computing platform 110 may determine at step 233 that the third deviation value does not exceed the first deviation threshold or the second deviation threshold, but does exceed the third deviation threshold. Accordingly, the message management computing platform 110 may determine that the fourth email message should be routed to an online mailbox, accessible by the target recipient of the fourth email message (e.g., the second user account).

At step 234, based on the third delivery modification, the message management computing platform 110 may route the fourth email message to the online mailbox. For example, the message management computing platform 110 may route the fourth email message to a message storage server, route the fourth email message for cloud based storage, and/or store the fourth email message in the message management database 112b. In doing so, the message management computing platform 110 may, in some instances, cause an indication to be sent to an intended recipient of the fourth email message (e.g., a user of the second user account) at predetermined intervals (e.g., once per day) indicating a list of messages stored in the online mailbox. In these instances, the message management computing platform 110 may send an indication to the intended recipient of the fourth email message (e.g., a user of the second user account) identifying a list of messages that have been flagged as potentially malicious and/or impersonated. Additionally or alternatively, the intended recipient (e.g., a user of the second user account) may access the online mailbox (e.g., via the third enterprise user device 150) on-demand (e.g., by accessing a domain corresponding to the online mailbox). In one or more instances, in accessing the online mailbox, the third enterprise user device 150 may present the user of the second user account with the option to block further correspondence from the sender of the fourth email message (e.g., the third user account) or to permit transmission of the fourth email message (e.g., to the second user account).

Figure 2I:
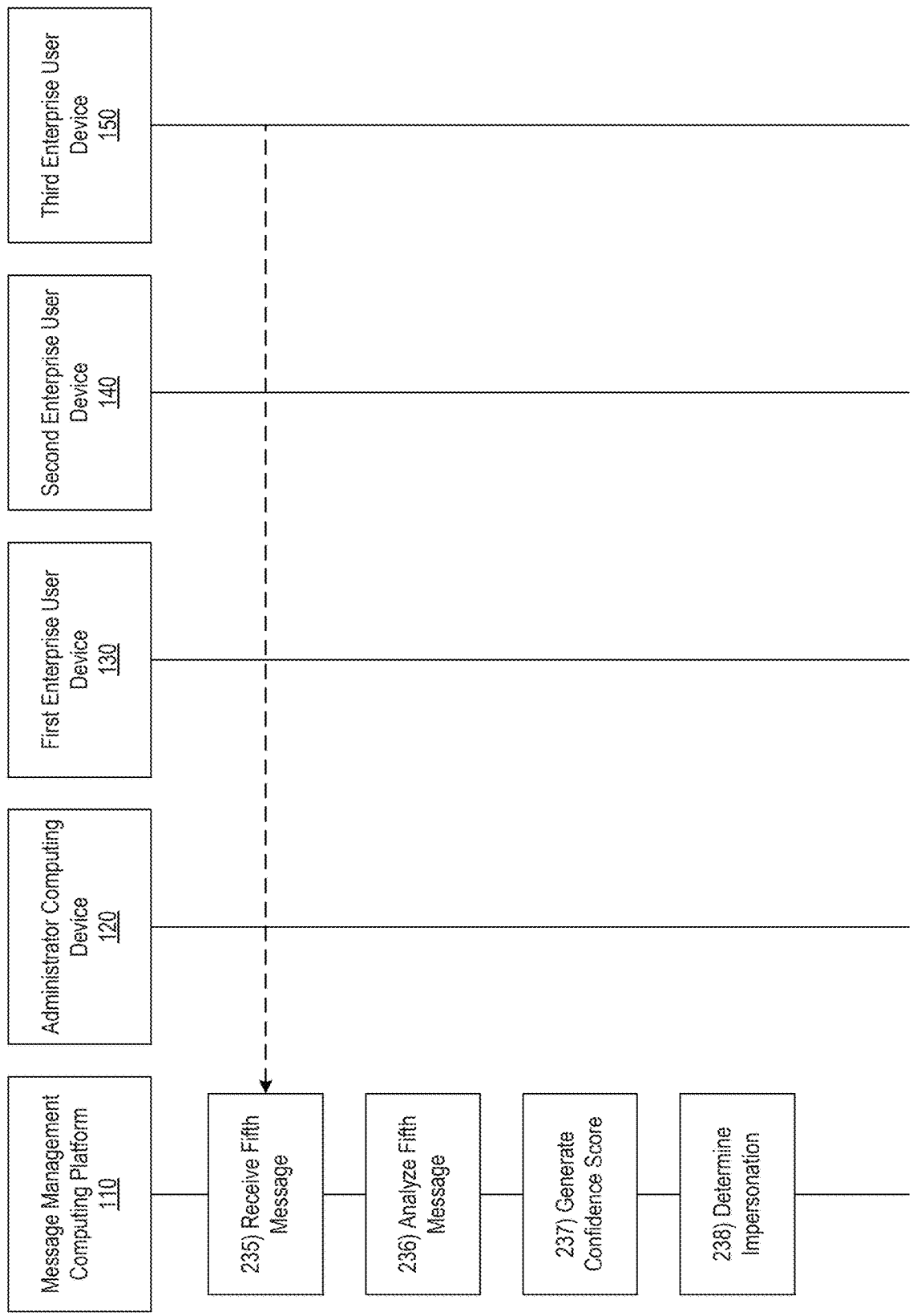

Referring to FIG. 2I, at step 235, the message management computing platform 110 may receive a fifth message (e.g., fifth email message). In one or more instances, in receiving the fifth email message from the third enterprise user device 150, the message management computing platform 110 may receive a message from a user account different from the third user account described above at steps 207-234. For the illustrative purposes of the event sequence shown in FIGS. 2A-2K, it should be understood that steps 235-243 are occurring once network security issues associated with the third user account (e.g., routing of the fourth email message to an online mailbox) have been addressed (e.g., steps 235-243 may describe management of a new and/or different instance of impersonation). In one or more instances, the message management computing platform 110 may receive the fifth email message via the communication interface 113 and while the second data connection is established. In one or more instances, in receiving the fifth message, the message management computing platform 110 may intercept the fifth message from the third enterprise user device 150 before it is received by the second enterprise user device 140.

At step 236, the message management computing platform 110 may analyze the fifth email message. For example, in analyzing the fifth email message, the message management computing platform 110 may perform steps similar to those described above with regard to analysis of the first, second, third, and fourth email messages at steps 204, 208, 215, and 229.

At step 237, message management computing platform 110 may generate a confidence score based on the results determined at step 237 (a fifth confidence score). In one or more instances, in generating the fifth confidence score, the message management computing platform 110 may perform steps similar to those described above with regard to generation of the confidence scores at steps 205, 209, 216, and 230. For illustrative purposes, however, it may be assumed that at step 237, the message management computing platform 110 determined that the results from step 236 had a low correlation to the user identification model for the third user account, but nevertheless had a higher correlation to the user identification model for the third user account than the correlations determined at steps 209, 216, and 230. For example, the message management computing platform 110 may generate a fourth confidence score of 5/10 for the fifth email message.

At step 238, the message management computing platform 110 may apply one or more impersonation algorithms to the fifth confidence score, generated at step 237, to determine whether or not the fifth email message was impersonated. In applying the one or more impersonation algorithms, the message management computing platform 110 may perform one or more actions similar to those described above with regard to step 210, 217, and 231.

Figure 2J:
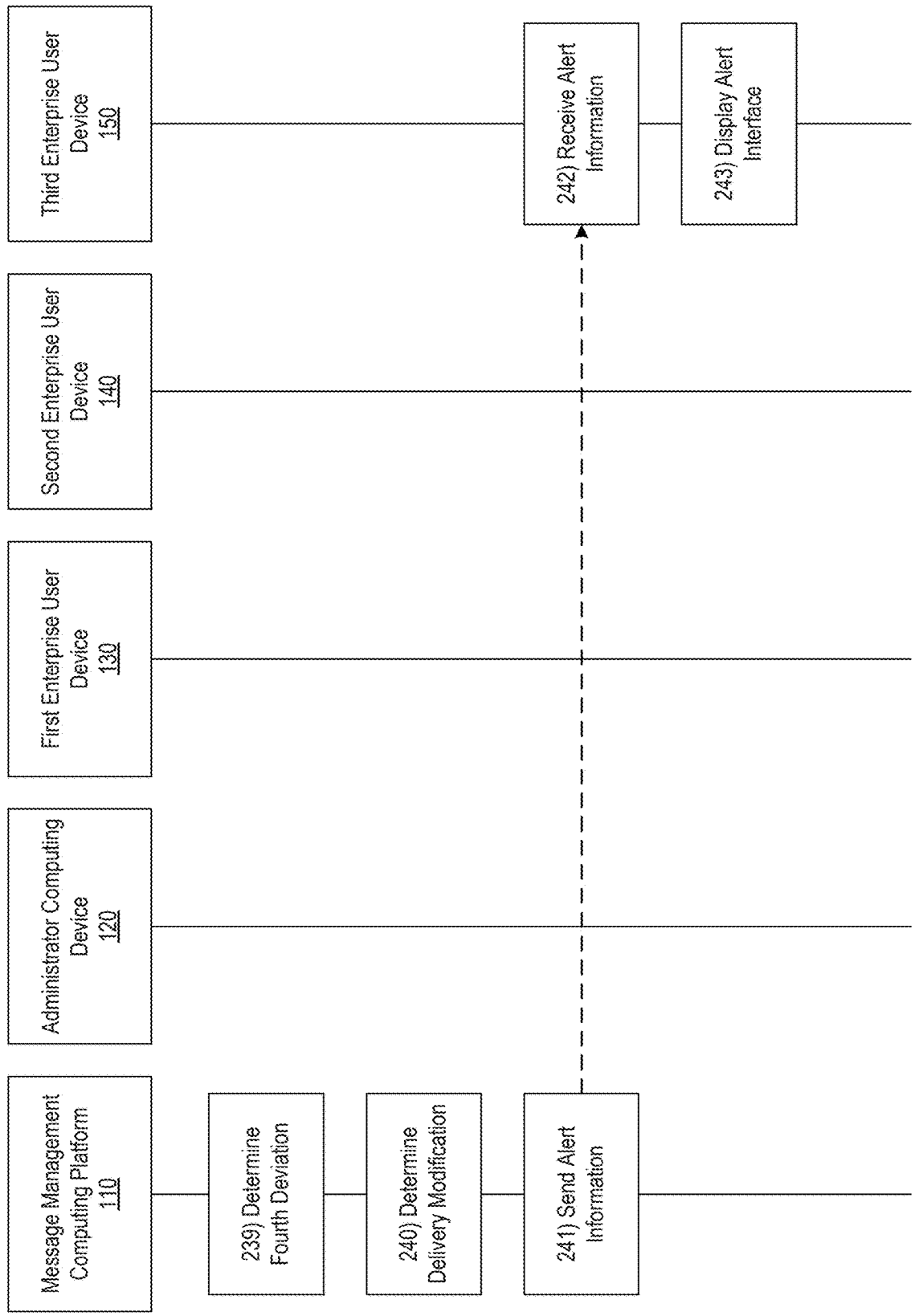

Referring to FIG. 2J, at step 239, the message management computing platform 110 may determine a fourth deviation value in response to determining, at step 238, that the fifth email message was likely impersonated. In determining the fourth deviation value, the message management computing platform 110 may perform steps similar to those described above at steps 211, 218, and 232 with regard to the determination of the first, second, and third deviation values. For illustrative purposes, however, the message management computing platform 110 may, at step 239, determine a deviation value between the fifth confidence score and the predetermined impersonation threshold.

In determining the fourth deviation value, the message management computing platform 110 may first compute a variance between the fifth confidence score and the predetermined impersonation threshold:

$$\sigma^2 = \frac{(x_1 - \mu)^2 + \ldots + (x_N - \mu)^2}{N} = \frac{(5 - 5.5)^2 + (6 - 5.5)^2}{2} = .25$$

Then to determine the standard deviation, the message management computing platform 110 may take the square root of the variance:

$$\sigma = \sqrt{\text{variance}} = \sqrt{.25} = .5$$

Thus, in the example illustrated in the example event sequence, the message management computing platform 110 may determine a fourth deviation value of 0.5.

At step 240, based on the fourth deviation value, the message management computing platform 110 may determine a fourth delivery modification. In determining the fourth delivery modification, the message management computing platform 110 may perform actions similar to those performed at steps 212, 219, and 233 with regard to determination of the first, second, and third delivery modifications. For illustrative purposes, however, the message management computing platform 110 may determine at step 240 that the fourth deviation value does not exceed any of the deviation thresholds. Accordingly, the message management computing platform 110 may determine that the sender of the fifth email message (e.g., the third user account) should be notified of the detected impersonation. Additionally or alternatively, the message management computing platform 110 may determine that the intended recipient of the fifth email message (e.g., the second user account) should be notified of the detected impersonation.

At step 241, in response to determining that the third user account should be notified of the detected impersonation, the message management computing platform 110 may generate and send, share, or otherwise provide alert information, along with one or more commands directing the third enterprise user device 150 to display an alert interface based on the alert information, to the third enterprise user device 150. In one or more instances, the message management computing platform 110 may send the alert information to the third enterprise user device 150 via the communication interface 113 and while the second data connection is established. In one or more instances, in addition to determining that the third user account should be notified, the message management computing platform 110 may determine that the second user account should also be notified. For example, the message management computing platform 110 may modify the text and/or the subject line of the fifth email message before sending the fifth email message to the second user account to alert the user of the second user account of the potential impersonation.

At step 242, the third enterprise user device 150 may receive or otherwise access the alert information and the one or more commands directing the third enterprise user device 150 to display an alert interface based on the alert information. In one or more instances, the third enterprise user device 150 may receive the alert information and the one or more commands directing the third enterprise user device 150 to display the alert interface while the second data connection is established.

Figure 4:
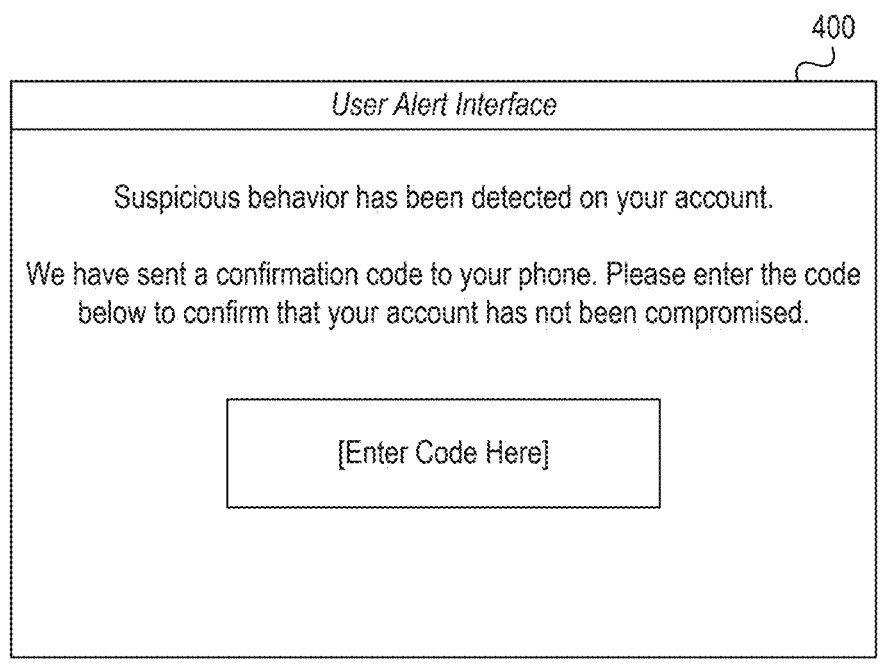

At step 243, the third enterprise user device 150 may generate and display an alert interface based on the alert information received at step 242. In one or more instances, in generating the alert interface, the third enterprise user device 150 may generate a user interface similar to graphical user interface 400, which is illustrated in FIG. 4. For example, the third enterprise user device 150 may generate and display a user interface indicating that an authentication code has been sent to a secondary device (e.g., a mobile device, or the like) for multi-factor authentication, and the third enterprise user device 150 may prompt a user (e.g., the user of the third user account) to input the authentication code in addition to his or her standard login information. In this example, the message management computing platform 110 may generate and send commands to the secondary device to display, or otherwise make available, the authentication code. Additionally or alternatively, in generating the alert interface, the third enterprise user device 150 may present the fifth email message to the user of the third user account along with a notification (e.g., a notification indicating that the email has been flagged as a potential impersonation). For example, the third enterprise user device 150 may display the notification in a heading or subject line of the fifth email message. In one or more instances, the third enterprise user device 150 may receive a user input from user of the third user account indicating that the fifth email message is a legitimate message and is not impersonated. In these instances, the third enterprise user device 150 may send an indication to the message management computing platform 110 to indicate that the fifth email message was incorrectly flagged as impersonated. In receiving the indication that the fifth email message was incorrectly flagged, the message management computing platform 110 may update one or more machine learning datasets used to analyze incoming messages. For example, the message management computing platform 110 may update one or more feature vectors from the user identification model associated with the user of the third user account. Accordingly, the message management computing platform 110 may continuously and dynamically improve its ability to analyze messages and increase the accuracy with which it identifies impersonated messages.

Referring to FIG. 2K, at step 244, the message management computing platform 110 may retune the deviation thresholds (e.g., using one or more machine learning algorithms) based on quantities of messages exceeding each deviation threshold. For example, the message management computing platform 110 may maintain target percentages for impersonated messages that should be associated with deviation values that exceed each threshold. For example, the message management computing platform 110 may automatically determine (or, in some instances, determine based on user input) that 25% of the flagged messages should exceed a first deviation threshold, 25% of the flagged messages should exceed a second deviation threshold (lower than the first deviation threshold) but not the first deviation threshold, 25% of the flagged messages should exceed a third deviation threshold (lower than the second deviation threshold) but not the second deviation threshold, and 25% of the flagged messages should not exceed the third deviation threshold. Accordingly, based on a percentage of messages over a predetermined period of time that are associated with deviation values exceeding each of the thresholds, the message management computing platform 110 may dynamically adjust the deviation thresholds to maintain the target percentages. For example, if the message management computing platform 110 determines that 40% of the flagged messages exceeded the first deviation threshold, the message management computing platform 110 may increase the first deviation threshold to make the standard for exceeding the first deviation threshold more difficult to meet and thus reduce an amount of flagged messages associated with deviation values that exceed the first deviation threshold. In doing so, the message management computing platform 110 may achieve results closer to the target percentages when comparing the flagged messages to the first deviation threshold. It should be understood that the retuning described at step 244 may occur after a predetermined period of time has elapsed since the initial thresholds were set and/or since the thresholds were last tuned, after a predetermined number of flagged messages have been identified and/or processed, and/or in real time as each message is received and processed by the message management computing platform 110.

Additionally or alternatively, the message management computing platform 110 may tune and/or otherwise dynamically adjust a feature list used in analyzing messages (e.g., a list of metrics to be analyzed in comparing various messages against the models). For example, the message management computing platform 110 may determine that particular features used in the models were redundant (e.g., word length and characters per word, or the like), other particular features should be prioritized and/or more heavily weighted (e.g., word count may be very indicative of impersonation whereas number of blank lines might not be), and/or that other adjustments should be made to the features used in the models. Subsequently, the message management computing platform 110 may adjust the model(s) based on such determination(s). Advantageously, by tuning the feature list, the message management computing platform 110 may conserve storage space and computing resources by eliminating the collection and storage of message data that might not be an effective indicator of whether a message was impersonated, while also improving the efficiency and effectiveness of one or more of the analysis processes described herein.

It should be understood that the steps described in the illustrative event sequence herein may be performed in any alternative sequence or order without departing from the scope of the disclosure. Furthermore, although three enterprise user devices and three user accounts are described, it should be understood that any number of user accounts and devices may be involved in the methods described herein. Finally, although the steps described in the illustrative event sequence herein are described primarily in terms of email messages, it should be understood that other types of message may be processed using the systems and methods described herein without departing from the scope of the disclosure, and furthermore that other alternative actions and/or response measures may be taken in response to determining the various impersonated messages and their corresponding deviation values.

The steps shown in the example event sequence above are included for illustrative purposes to show how the message management computing platform 110 may handle different messages that are associated with different levels of potential impersonation. For example, it should be understood that in some instances, steps 214-227 may occur in lieu of steps 207-213. Alternatively, steps 214-227 may occur in addition to steps 207-213. As another example, it should be understood that steps 228-234 may, in some instances, occur in lieu of steps 207-227. Alternatively, steps 228-234 may occur in addition to steps 207-227. As yet another example, it should be understood that steps 235-243 may, in some instances, occur in lieu of steps 207-234 (e.g., multiple accounts may be accessed via third enterprise user device 150). Alternatively, steps 235-243 may occur in addition to steps 207-234.

Figure 5:
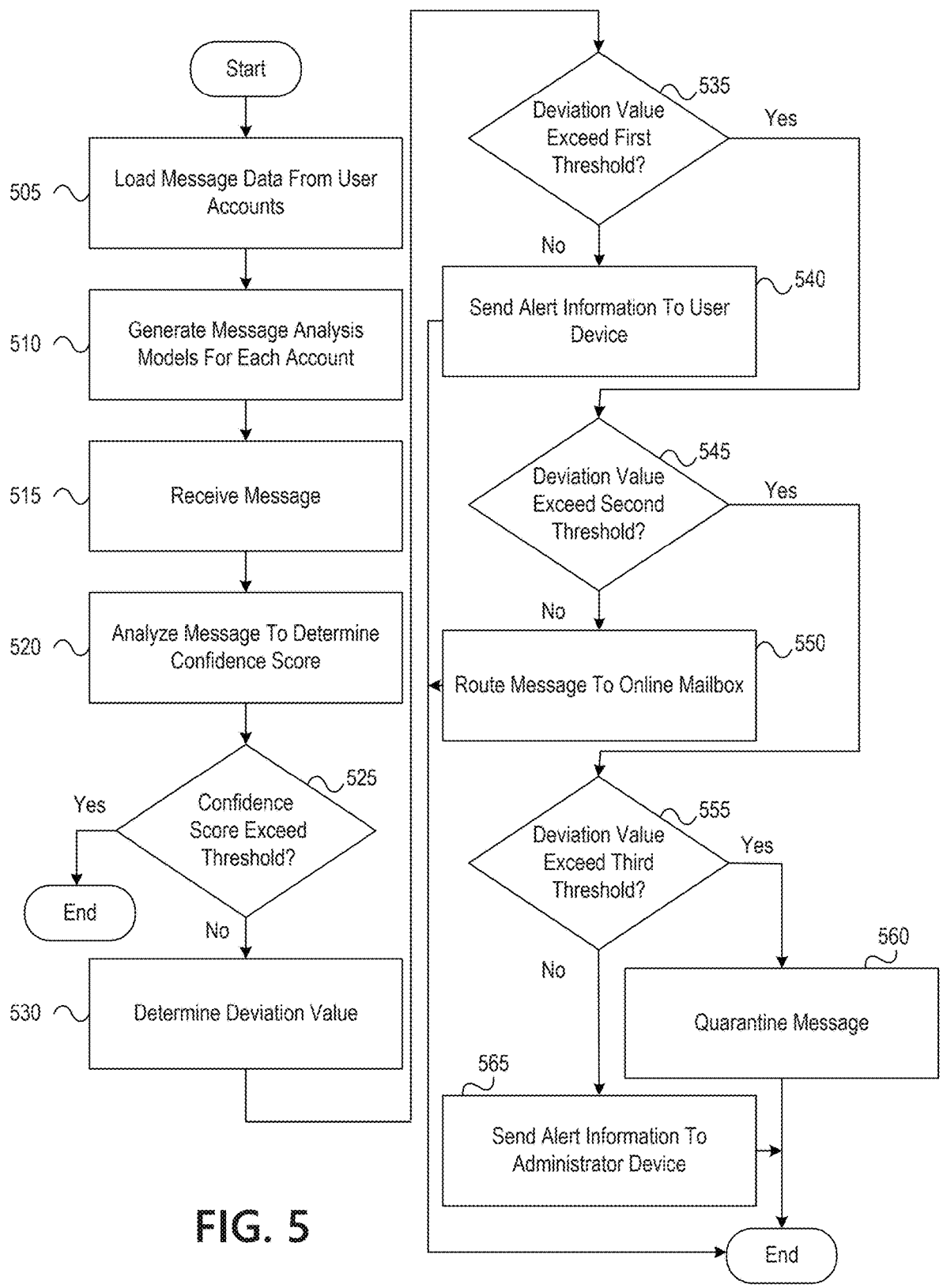
FIG. 5 depicts an illustrative method for detecting impersonation in email body content using machine learning in accordance with one or more example embodiments.

FIG. 5 depicts an illustrative method for detecting impersonation in email body content using machine learning in accordance with one or more example embodiments. Referring to FIG. 5, at step 505, a computing platform having at least one processor, a communication interface, and memory may load message data from one or more user accounts. At step 510, the computing platform may generate message analysis models for each of the one or more user accounts based on the message data. At step 515, the computing platform may receive a message. At step 520, the computing platform may analyze the message to determine a confidence score indicative of whether the message appears legitimate or impersonated. At step 525, the computing platform may determine whether the confidence score exceeds a predetermined threshold. If the computing platform determines that the confidence score exceeds the predetermined threshold, the computing platform may determine that the message is legitimate, and the method may end. If the computing platform determines that the confidence score does not exceed the predetermined threshold, the computing platform may proceed to step 530.

At step 530, the computing platform may determine a deviation value between the confidence score and the predetermined threshold. At step 535, the computing platform may determine whether the deviation value exceeds a first deviation threshold. If the computing platform determines that the deviation value does not exceed the first threshold, the computing platform may proceed to step 540. If the computing platform determines that the deviation value does exceed the first deviation threshold, the computing platform may proceed to step 545.

At step 540, the computing platform may generate and send alert information to a user device along with one or more commands directing the user device to display an alert interface using the alert information. At step 545, the computing platform may determine whether the deviation value exceeds a second deviation threshold. If the computing platform determines that the deviation value does exceed the second deviation threshold, the computing platform may proceed to step 555. If the computing platform determines that the deviation value does not exceed the deviation threshold, the computing platform may proceed to step 550.

At step 550, the computing platform may route the message to an online mailbox configured to store a plurality of flagged messages. At step 555, the computing platform may determine whether the deviation value exceeds a third deviation value. If the computing platform determines that the deviation value does exceed the third deviation threshold, the computing platform may proceed to step 560. If the computing platform determines that the deviation value does not exceed the third deviation threshold, the computing platform may proceed to step 565.

At step 560, the computing platform may quarantine the message, disable the user account, and/or isolate a user device associated with a sender of the message. At step 565, the computing platform may send alert information to an administrator device along with one or more commands directing the administrator device to display an alert interface based on the alert information.

It should be understood that the analysis processes, method steps, and/or methods described herein may be performed in different orders and/or in alternative arrangements from those illustrated herein, without departing from the scope of this disclosure. Additionally or alternatively, one or more of the analysis processes, method steps, and/or methods described herein may be optional and/or omitted in some arrangements, without departing from the scope of this disclosure.

One or more aspects of the disclosure may be embodied in computer-usable data or computer-executable instructions, such as in one or more program modules, executed by one or more computers or other devices to perform the operations described herein. Program modules may include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

One or more aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). The one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
generate, based on email data received from a plurality of user accounts, a plurality of user identification models;
intercept a first email message from a first user account of the plurality of user accounts to a second user account of the plurality of user accounts;
apply a first model of the plurality of user identification models to the first email message to calculate a first plurality of feature vectors for the first email message, wherein the first model of the plurality of user identification models is specific to the first user account of the plurality of user accounts;
apply one or more impersonation algorithms to the first plurality of feature vectors to determine results of the one or more impersonation algorithms, wherein applying the one or more impersonation algorithms to the first plurality of feature vectors indicates that the first email message is an impersonated message;
based on the results of the one or more impersonation algorithms, modify delivery of the first email message;
intercept a second email message from a third user account of the plurality of user accounts to the second user account of the plurality of user accounts;
apply a second model of the plurality of user identification models to the second email message to calculate a second plurality of feature vectors for the second email message, wherein the second model of the plurality of user identification models is specific to the third user account of the plurality of user accounts;
apply the one or more impersonation algorithms to the second plurality of feature vectors, wherein applying the one or more impersonation algorithms to the second plurality of feature vectors indicates that the second email message is a legitimate message; and
based on results of the one or more impersonation algorithms, permit delivery of the second email message.

2. The computing platform of claim 1, wherein the memory stores additional computer-readable instructions that, when executed by the at least one processor, cause the computing platform to:
determine, based on applying the one or more impersonation algorithms, a confidence score indicative of a likelihood that the first email message is an impersonated message;
determine a deviation value between the confidence score and a predetermined impersonation threshold;

determine that the deviation value does not exceed a first deviation threshold of a plurality of deviation thresholds;

determine, based on the determination that the deviation value does not exceed the first deviation threshold, alert information indicating that the first email message is an impersonated message, wherein modifying delivery of the first email message comprises:

sending, to a user device associated with the first user account, the alert information, wherein sending the alert information causes the user device associated with the first user account to display an alert indicating that the first email message is an impersonated message; and sending, to a user device associated with the second user account, the first email message.

3. The computing platform of claim 2, wherein modifying delivery of the first email message comprises modifying a subject line of the first email message prior to sending the first email message to the user device associated with the second user account.

4. The computing platform of claim 2, wherein the memory stores additional computer-readable instructions that, when executed by the least one processor, cause the computing platform to:

receive, from the user device associated with the first user account, an indication that the first email message was not impersonated; and update, based on the indication that the first email message was not impersonated, one or more machine learning datasets to indicate that the first email message was legitimate.

5. The computing platform of claim 2, wherein the memory stores additional computer-readable instructions that, when executed by the at least one processor, cause the computing platform to:

retune the plurality of deviation thresholds based on a target percentage of email messages to be flagged as impersonated, wherein the retuning is based on one or more machine learning datasets comprising indications of identified impersonated messages.

6. The computing platform of claim 1, wherein the memory stores additional computer-readable instructions that, when executed by the at least one processor, cause the computing platform to:

determine, based on applying the one or more impersonation algorithms, a confidence score indicative of a likelihood that the first email message is an impersonated message;

determine a deviation value between the confidence score and a predetermined impersonation threshold;

determine that the deviation value exceeds a first deviation threshold but does not exceed a second deviation threshold;

determine, based on the determination that the deviation value exceeds the first deviation threshold but does not exceed the second deviation threshold, that the first email message should be routed to an online mailbox configured to receive messages flagged as impersonated, wherein the online mailbox is accessible by a user device associated with the second user account; and route, to the online mailbox, the first email message.

7. The computing platform of claim 1, wherein the memory stores additional computer-readable instructions that, when executed by the at least one processor, cause the computing platform to:

determine, based on applying the one or more impersonation algorithms, a confidence score indicative of a likelihood that the first email message is an impersonated message;

determine a deviation value between the confidence score and a predetermined impersonation threshold;

determine that the deviation value exceeds a first deviation threshold and a second deviation threshold greater than the first deviation threshold but does not exceed a third deviation threshold greater than the second deviation threshold;

determine, based on the determination that the deviation value exceeds the first deviation threshold and the second deviation threshold but does not exceed the third deviation threshold, that an administrator computing device should be notified that the first email message is an impersonated message; and send, to the administrator computing device, impersonation alert information, wherein sending the impersonation alert information to the administrator computing device causes the administrator computing device to display an impersonation warning interface.

8. The computing platform of claim 7, wherein the memory stores additional computer-readable instructions that, when executed by the at least one processor, cause the computing platform to:

receive, from the administrator computing device, one or more commands directing the computing platform to delete the first email message.

9. The computing platform of claim 1, wherein the memory stores additional computer-readable instructions that, when executed by the at least one processor, cause the computing platform to:

determine, based on applying the one or more impersonation algorithms, a confidence score indicative of a likelihood that the first email message is an impersonated message;

determine a deviation value between the confidence score and a predetermined impersonation threshold;

determine that the deviation value exceeds a deviation threshold of a plurality of deviation thresholds;

determine, based on the determination that the deviation value exceeds the deviation threshold of the plurality of deviation thresholds, that the first email message should be quarantined; and prevent transmission of the first email message to a user device associated with the second user account.

10. The computing platform of claim 1, wherein the email data comprises one or more of: a number of blank lines, a total number of lines, an average sentence length, an average word length, a vocabulary richness score, stop word frequency, a number of times one or more distinct words are used a single time, a total number of characters, a total number of alphabetic characters, a total number of uppercase characters, a total number of digits, a total number of white-space characters, a total number of tabs, a total number of punctuation marks, a word length frequency distribution, or a parts of speech frequency distribution.

11. The computing platform of claim 10, wherein the memory stores additional computer-readable instructions that, when executed by the at least one processor, cause the computing platform to:

determine the vocabulary richness score by determining a number of distinct words and a number of total words; and dividing the number of distinct words by the number of total words.

12. A method, comprising:
at a computing platform comprising at least one processor, a communication interface, and memory:
generating, by the at least one processor, based on email data received from a plurality of user accounts, a plurality of user identification models;
intercepting, by the at least one processor, a first email message from a first user account of the plurality of user accounts to a second user account of the plurality of user accounts;
applying, by the at least one processor, a first model of the plurality of user identification models to the first email message to calculate a first plurality of feature vectors for the first email message, wherein the first model of the plurality of user identification models is specific to the first user account of the plurality of user accounts;
applying, by the at least one processor, one or more impersonation algorithms to the first plurality of feature vectors to determine results of the one or more impersonation algorithms, wherein applying the one or more impersonation algorithms to the first plurality of feature vectors indicates that the first email message is an impersonated message; and
based on the results of the one or more impersonation algorithms, modifying, by the at least one processor, delivery of the first email message;
intercepting, by the at least one processor, a second email message from a third user account of the plurality of user accounts to the second user account of the plurality of user accounts;
applying, by the at least one processor, a second model of the plurality of user identification models to the second email message to calculate a second plurality of feature vectors for the second email message, wherein the second model of the plurality of user identification models is specific to the third user account of the plurality of user accounts;
applying, by the at least one processor, the one or more impersonation algorithms to the second plurality of feature vectors, wherein applying the one or more impersonation algorithms to the second plurality of feature vectors indicates that the second email message is a legitimate message; and
based on results of the one or more impersonation algorithms, permitting, by the at least one processor, delivery of the second email message.

13. The method of claim 12, wherein the computing platform is further configured to:
determining, by the at least one processor and based on applying the one or more impersonation algorithms, a confidence score indicative of a likelihood that the first email message is an impersonated message;
determining, by the at least one processor, a deviation value between the confidence score and a predetermined impersonation threshold;
determining, by the at least one processor, that the deviation value does not exceed a first deviation threshold of a plurality of deviation thresholds;
determining, by the at least one processor and based on the determination that the deviation value does not exceed the first deviation threshold, alert information indicating that the first email message is an impersonated message,
wherein modifying delivery of the first email message comprises:
sending, by the at least one processor and to a user device associated with the first user account, the alert information, wherein sending the alert information causes the user device associated with the first user account to display an alert indicating that the first email message is an impersonated message; and
sending, by the at least one processor and to a user device associated with the second user account, the first email message.

14. The method of claim 13, wherein modifying delivery of the first email message comprises modifying a subject line of the first email message prior to sending the first email message to the user device associated with the second user account.

15. The method of claim 13, wherein the memory stores additional computer-readable instructions that, when executed by the least one processor, cause the computing platform to:
receiving, by the at least one processor and from the user device associated with the first user account, an indication that the first email message was not impersonated; and
updating, by the at least one processor and based on the indication that the first email message was not impersonated, one or more machine learning datasets to indicate that the first email message was legitimate.

16. The method of claim 13, further comprising:
determining, by the at least one processor and based on applying the one or more impersonation algorithms, a confidence score indicative of a likelihood that the first email message is an impersonated message;
determining, by the at least one processor, a deviation value between the confidence score and a predetermined impersonation threshold;
determining, by the at least one processor, that the deviation value exceeds a first deviation threshold and a second deviation threshold greater than the first deviation threshold but does not exceed a third deviation threshold greater than the second deviation threshold;
determining, by the at least one processor and based on the determination that the deviation value exceeds the first deviation threshold and the second deviation threshold but does not exceed the third deviation threshold, that an administrator computing device should be notified that the first email message is an impersonated message; and
sending, by the at least one processor and to the administrator computing device, impersonation alert information, wherein sending the impersonation alert information to the administrator computing device causes the administrator computing device to display an impersonation warning interface.

17. One or more non-transitory computer-readable media storing instructions that, when executed by a computing platform comprising at least one processor, a communication interface, and memory, cause the computing platform to:
generate, based on email data received from a plurality of user accounts, a plurality of user identification models, wherein each of the plurality of user identification models is specific to one of the user accounts;
intercept a first email message from a first user account of the plurality of user accounts to a second user account of the plurality of user accounts;
apply a first model of the plurality of user identification models to the first email message to calculate a first plurality of feature vectors for the first email message, wherein the first model of the plurality of user identification models is specific to the first user account of the plurality of user accounts;

apply one or more impersonation algorithms to the first plurality of feature vectors to determine results of the one or more impersonation algorithms, wherein applying the one or more impersonation algorithms to the first plurality of feature vectors indicates that the first email message is an impersonated message;

based on the results of the one or more impersonation algorithms, modify delivery of the first email message;

intercept a second email message from a third user account of the plurality of user accounts to the second user account of the plurality of user accounts;

apply a second model of the plurality of user identification models to the second email message to calculate a second plurality of feature vectors for the second email message, wherein the second model of the plurality of user identification models is specific to the third user account of the plurality of user accounts;

apply the one or more impersonation algorithms to the second plurality of feature vectors, wherein applying the one or more impersonation algorithms to the second plurality of feature vectors indicates that the second email message is a legitimate message; and based on results of the one or more impersonation algorithms, permit delivery of the second email message.

18. The one or more non-transitory computer-readable media of claim 17, further including instructions that cause the computing platform to:

determine, based on applying the one or more impersonation algorithms, a confidence score indicative of a likelihood that the first email message is an impersonated message;

determine a deviation value between the confidence score and a predetermined impersonation threshold;

determine that the deviation value does not exceed a first deviation threshold of a plurality of deviation thresholds;

determine, based on the determination that the deviation value does not exceed the first deviation threshold, alert information indicating that the first email message is an impersonated message, wherein modifying delivery of the first email message comprises:

sending, to a user device associated with the first user account, the alert information, wherein sending the alert information causes the user device associated with the first user account to display an alert indicating that the first email message is an impersonated message; and sending, to a user device associated with the second user account, the first email message.

19. The one or more non-transitory computer-readable media of claim 18, wherein modifying delivery of the first email message comprises modifying a subject line of the first email message prior to sending the first email message to the user device associated with the second user account.

* * * * *